(12) United States Patent
Oki et al.

(10) Patent No.: US 11,747,278 B2
(45) Date of Patent: Sep. 5, 2023

(54) DEPOSIT DETECTION DEVICE FOR DETECTING A PARTIAL COVERING LOCATION, A NOT-ADHERE LOCATION, AND A DIFFUSE REFLECTION LOCATION

(71) Applicant: DENSO TEN Limited, Kobe (JP)

(72) Inventors: Tomokazu Oki, Kobe (JP); Nobunori Asayama, Kobe (JP); Takashi Kono, Kobe (JP); Yasushi Tani, Kobe (JP); Daisuke Yamamoto, Kobe (JP); Nobuhisa Ikeda, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 330 days.

(21) Appl. No.: 17/016,583

(22) Filed: Sep. 10, 2020

(65) Prior Publication Data
US 2021/0088441 A1    Mar. 25, 2021

(30) Foreign Application Priority Data

Sep. 20, 2019   (JP) ................................ 2019-172209

(51) Int. Cl.
*G01N 21/47*    (2006.01)
*G06T 7/73*     (2017.01)
(Continued)

(52) U.S. Cl.
CPC ....... *G01N 21/4738* (2013.01); *G06T 7/0002* (2013.01); *G06T 7/13* (2017.01);
(Continued)

(58) Field of Classification Search
None
See application file for complete search history.

(56) References Cited

U.S. PATENT DOCUMENTS 5,726,705 A * 3/1998 Imanishi ............ G01N 21/8806
                                                      356/600
7,733,359 B1 * 6/2010 Hagge ................. H10K 59/131
                                                      349/146
(Continued)

FOREIGN PATENT DOCUMENTS

JP    2012-038048 A    2/2012
JP    2014-007686 A    1/2014
(Continued)

*Primary Examiner* — Haimei Jiang
(74) *Attorney, Agent, or Firm* — Oliff PLC

(57) ABSTRACT

A deposit detection device according to an embodiment includes a calculation module, a detection module, an interpolation module, and a state management module. The calculation module calculates a region feature amount based on an edge vector of each pixel, for each unit region composed of a predetermined number of pixels included in a captured image. The detection module detects the unit region corresponding to a partial covering location and the unit region corresponding to a diffuse reflection location based on a detection condition and a second detection condition, respectively, the first detection condition and the second detection condition being based on the region feature amount. The interpolation module interpolates the area ratio of the partial covering location reduced due to the diffuse reflection location. The state management module controls state transitions of states related to interpolation of the area ratio, based on increase and decrease of the diffuse reflection location.

18 Claims, 19 Drawing Sheets

(51) Int. Cl.
*G06T 7/136* (2017.01)
*G06T 7/00* (2017.01)
*G06T 7/13* (2017.01)

(52) U.S. Cl.
CPC ................ *G06T 7/136* (2017.01); *G06T 7/73* (2017.01); *G01N 2021/4769* (2013.01)

(56) References Cited

U.S. PATENT DOCUMENTS

| | | | |
|---|---|---|---|
| 8,045,760 B2* | 10/2011 | Stam | G06V 20/58 362/465 |
| 8,559,753 B2* | 10/2013 | Cramblitt | G06T 5/003 382/280 |
| 2007/0221826 A1* | 9/2007 | Bechtel | G02B 13/0025 250/208.1 |
| 2010/0004875 A1* | 1/2010 | Urano | G01N 21/4738 356/237.2 |
| 2013/0314512 A1* | 11/2013 | Watanabe | H04N 13/312 348/51 |
| 2013/0338092 A1* | 12/2013 | Hartwell | A61K 31/704 514/622 |
| 2018/0017791 A1* | 1/2018 | Beckman | H04N 23/55 |
| 2018/0174328 A1* | 6/2018 | Wan | G06T 5/20 |
| 2019/0138821 A1* | 5/2019 | Mu | G05D 1/0088 |
| 2019/0333189 A1* | 10/2019 | Tamal | G06T 11/008 |
| 2021/0088441 A1* | 3/2021 | Oki | G01N 21/4738 |

FOREIGN PATENT DOCUMENTS

| | | |
|---|---|---|
| JP | 2015-184903 A | 10/2015 |
| JP | 2019-106644 A | 6/2019 |

* cited by examiner

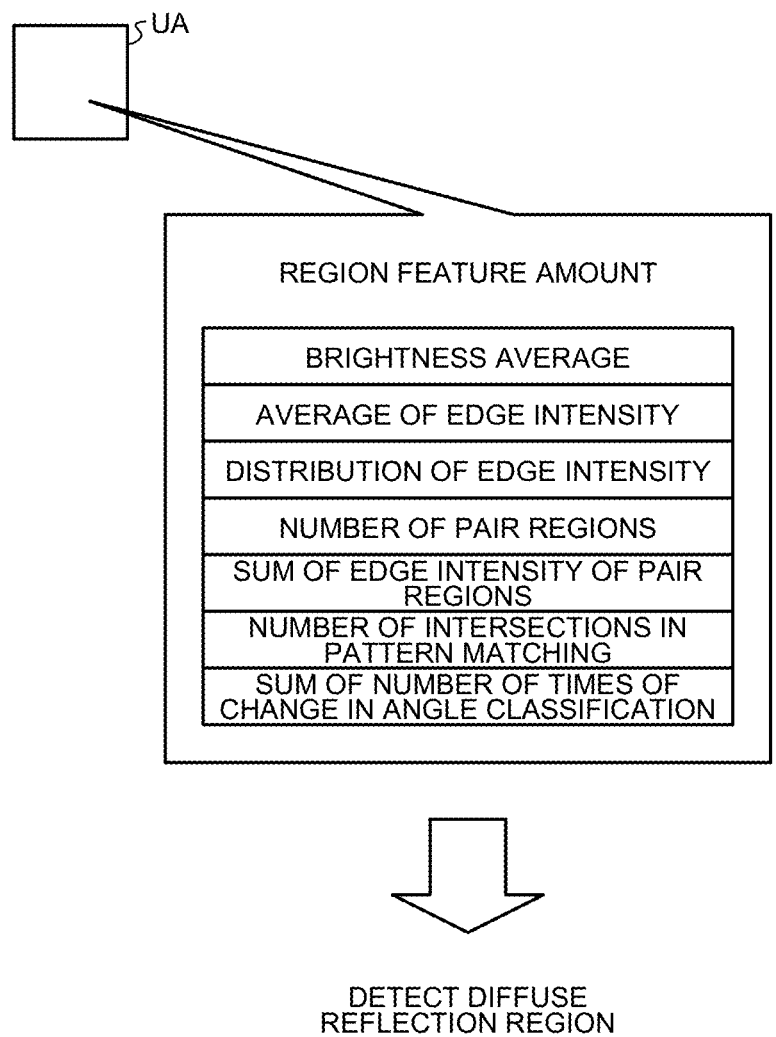

FIG.1C

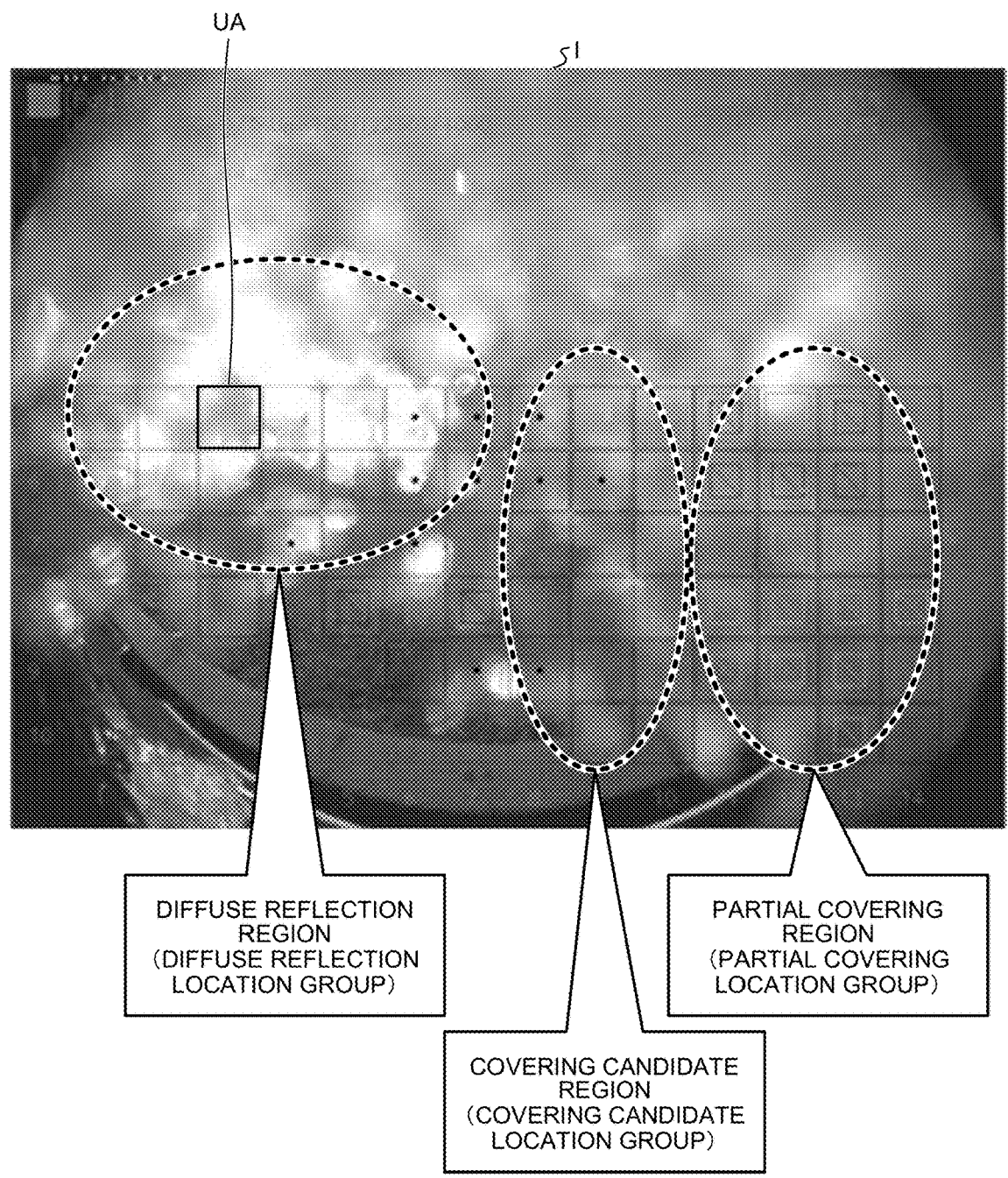

DIFFUSE REFLECTION REGION
(DIFFUSE REFLECTION LOCATION GROUP)

COVERING CANDIDATE REGION
(COVERING CANDIDATE LOCATION GROUP)

PARTIAL COVERING REGION
(PARTIAL COVERING LOCATION GROUP)

NUMBER OF PARTIAL COVERING LOCATIONS + NUMBER OF DIFFUSE REFLECTION LOCATIONS + NUMBER OF COVERING CANDIDATE LOCATIONS

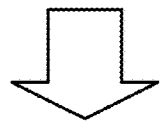

NUMBER OF PARTIAL COVERING LOCATIONS (AFTER INTERPOLATION)

FIG.1D
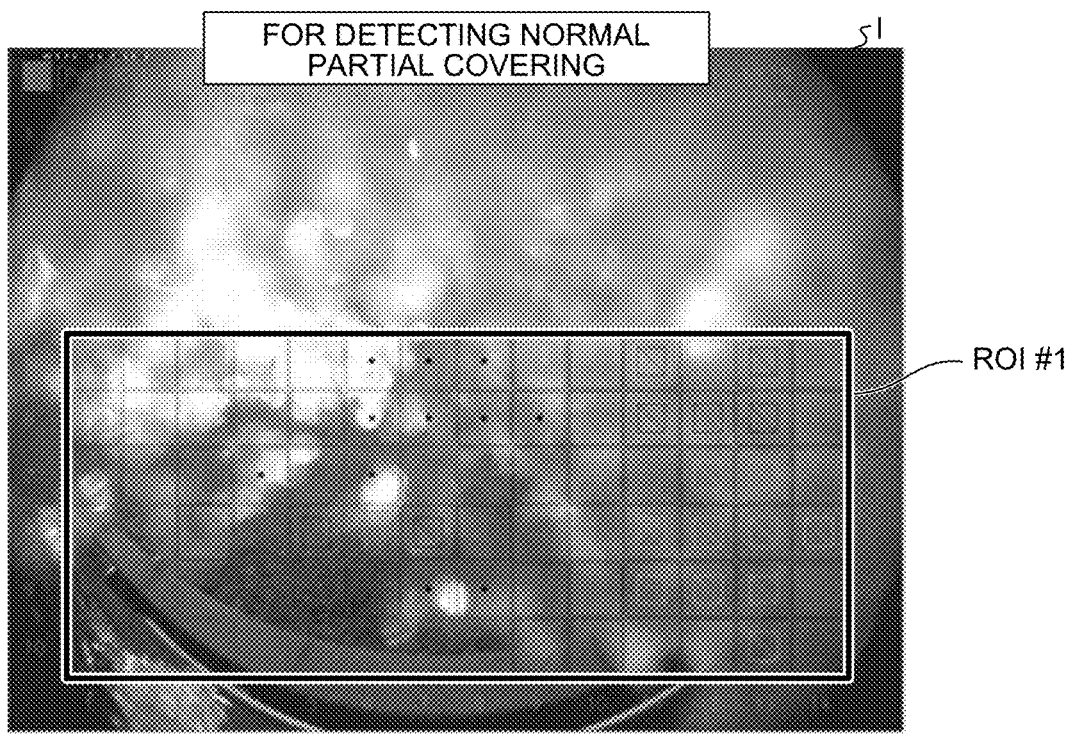
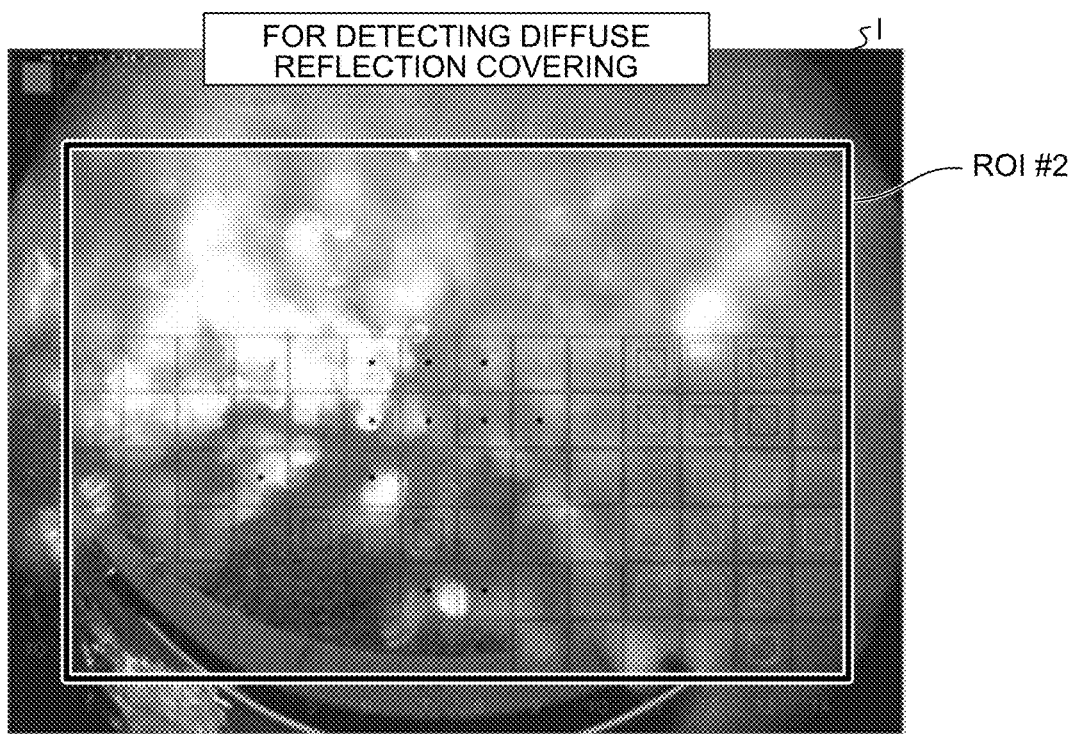

FIG.1E

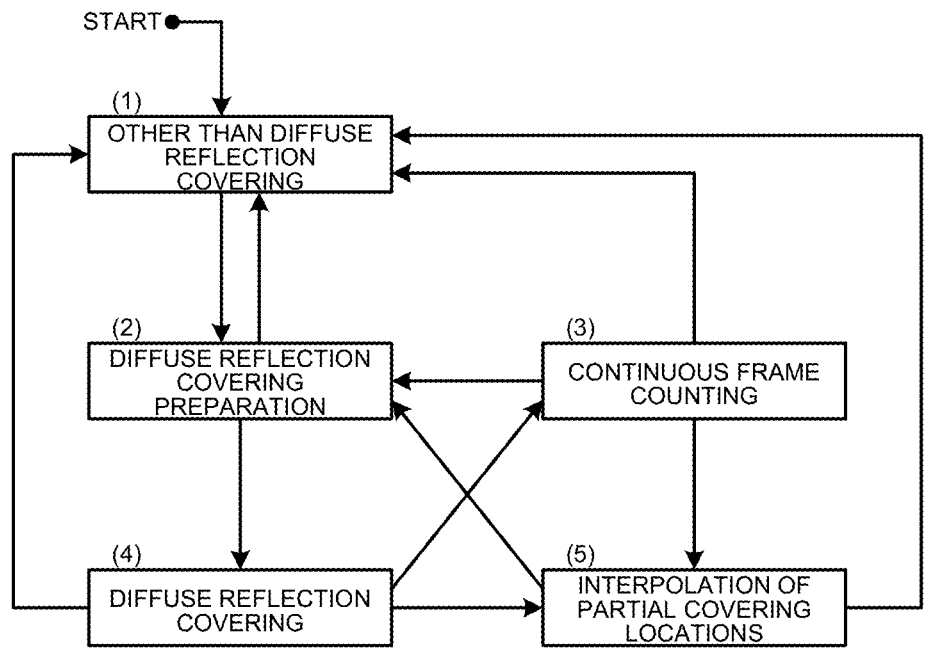

| (1) | OTHER THAN DIFFUSE REFLECTION COVERING | STATE OF NOT BEING DIFFUSION REFLECTION COVERING |
|---|---|---|
| (2) | DIFFUSE REFLECTION COVERING PREPARATION | STATE WITH SIGN OF DIFFUSE REFLECTION COVERING |
| (3) | CONTINUOUS FRAME COUNTING | OBSERVATION STATE OF STABILIZATION OF DIFFUSE REFLECTION COVERING |
| (4) | DIFFUSE REFLECTION COVERING | COVERED STATE INVOLVING DIFFUSE REFLECTION |
| (5) | INTERPOLATION OF PARTIAL COVERING LOCATIONS | INTERPOLATED STATE OF PARTIAL COVERING LOCATIONS |

FIG.7
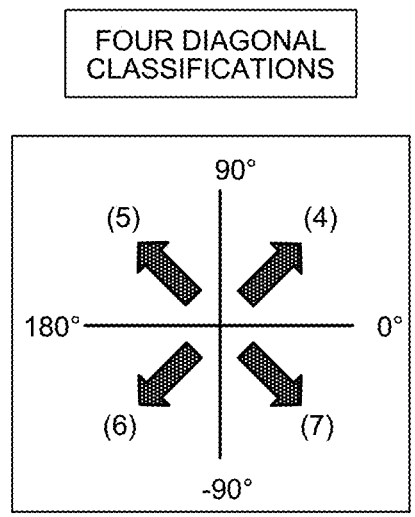
FIG.8
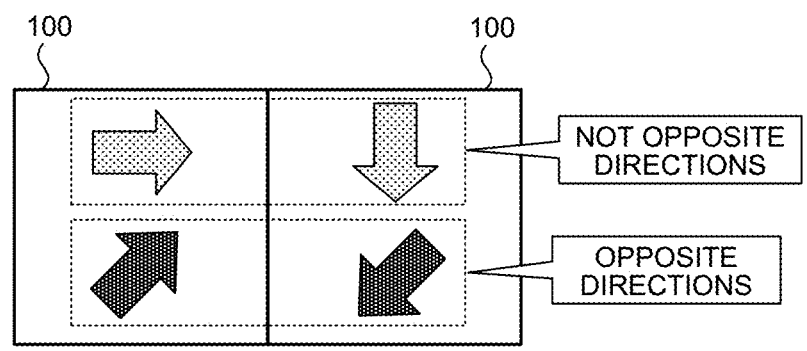
PAIR REGION

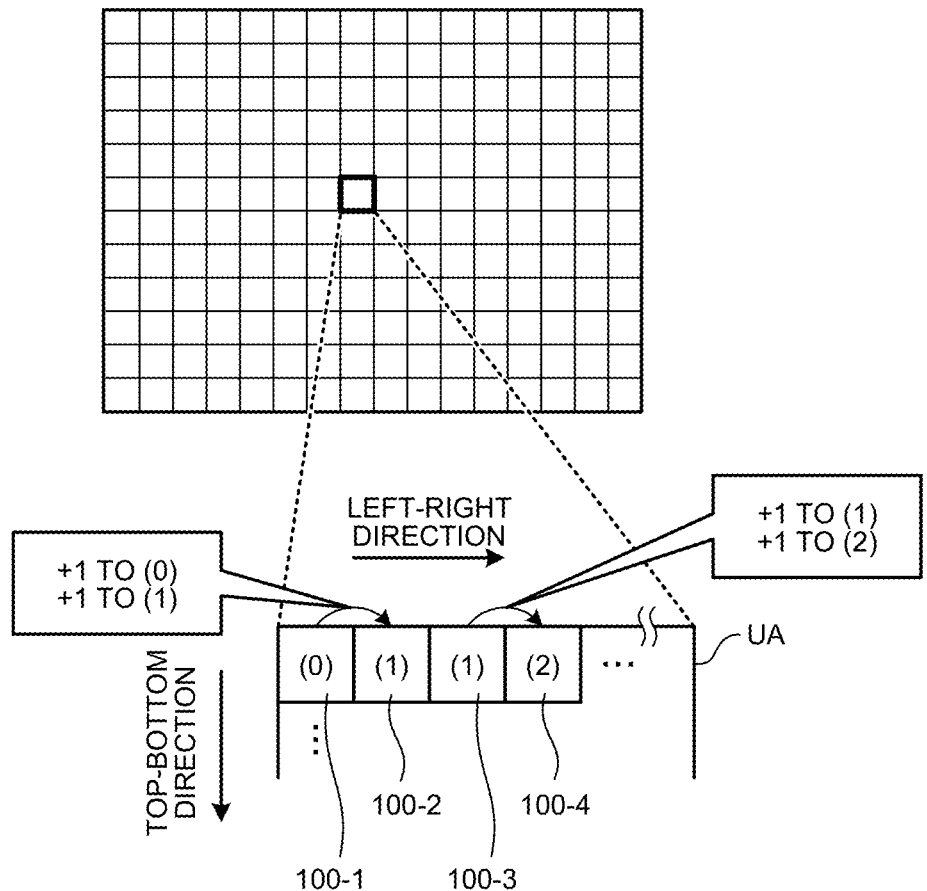

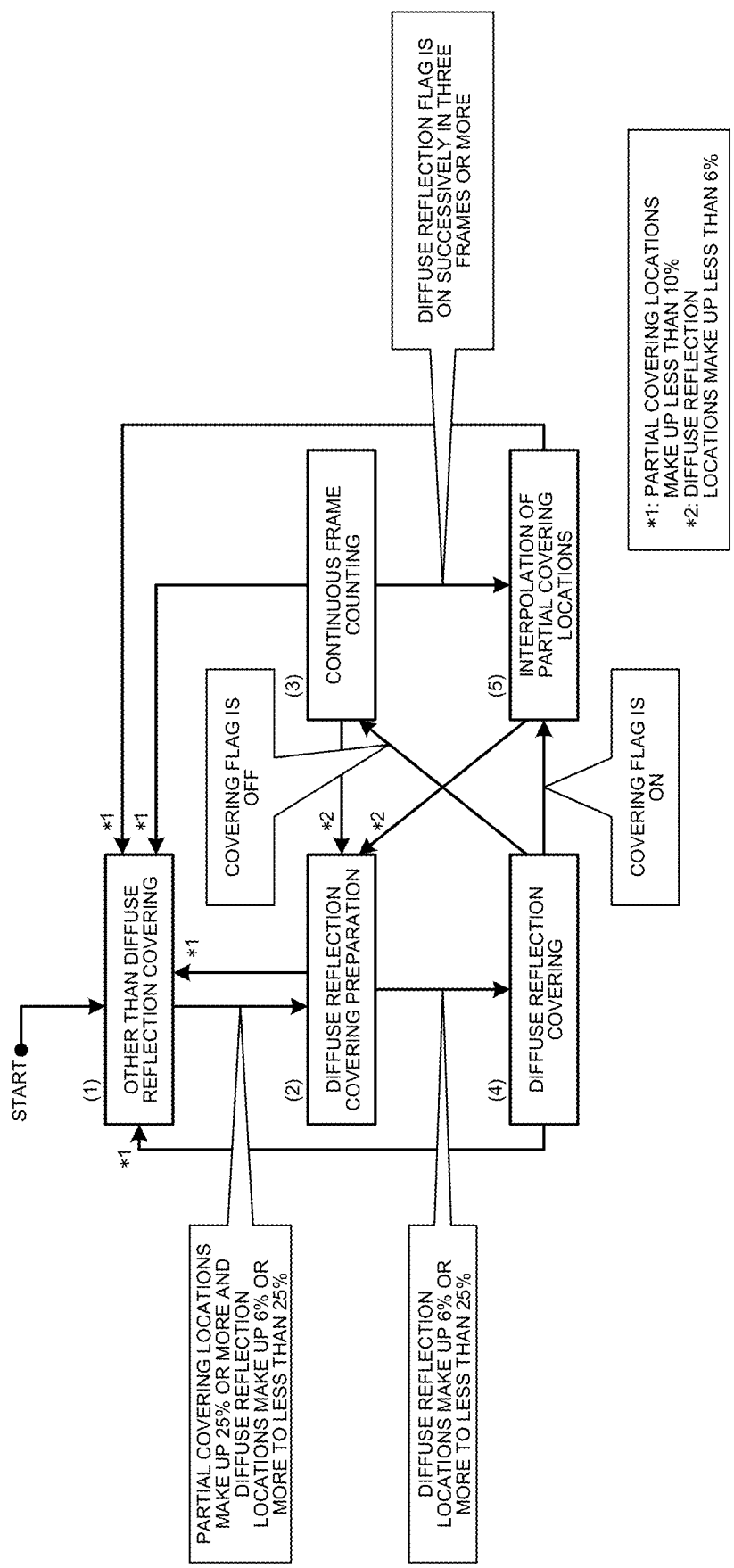

DEPOSIT DETECTION DEVICE FOR DETECTING A PARTIAL COVERING LOCATION, A NOT-ADHERE LOCATION, AND A DIFFUSE REFLECTION LOCATION

CROSS-REFERENCE TO RELATED APPLICATION

This application is based upon and claims the benefit of priority of the prior Japanese Patent Application No. 2019-172209, filed on Sep. 20, 2019, the entire contents of which are incorporated herein by reference.

FIELD

The embodiment discussed herein is directed to a deposit detection device and a deposit detection method.

BACKGROUND

Conventionally, a deposit detection device is known which detects a deposit adhering to a camera lens, based on a captured image captured by a camera mounted on a vehicle, for example. Some deposit detection devices detect a deposit, for example, based on a difference between time-series captured images (for example, refer to Japanese Laid-open Patent Publication No. 2012-038048).

Unfortunately, the conventional technique described above has room for improvement in the accuracy in deposit detection.

SUMMARY

A deposit detection device according to an embodiment includes a calculation module, a detection module, an interpolation module, and a state management module. The calculation module configured to calculate a region feature amount based on an edge vector of each pixel, for each unit region composed of a predetermined number of pixels included in a captured image. The detection module configured to detect the unit region corresponding to a partial covering location and the unit region corresponding to a diffuse reflection location based on a first detection condition and a second detection condition, respectively, the first detection condition and the second detection condition being based on the region feature amount. The interpolation module configured to interpolate an area ratio of the partial covering location reduced due to the diffuse reflection location. The state management module configured to manage state transitions of states related to interpolation of the area ratio, based on increase and decrease of the diffuse reflection location.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 1B is an overall explanatory diagram (2) of the deposit detection method according to the embodiment.

FIG. 1C is an overall explanatory diagram (3) of the deposit detection method according to the embodiment.

FIG. 1D is an overall explanatory diagram (4) of the deposit detection method according to the embodiment.

FIG. 1E is an overall explanatory diagram (5) of the deposit detection method according to the embodiment.

FIG. 7 is a diagram (5) illustrating the process in the calculation module.

FIG. 8 is a diagram (6) illustrating the process in the calculation module.

FIG. 15 is a diagram (13) illustrating the process in the calculation module.

FIG. 16 is a diagram (14) illustrating the process in the calculation module.

FIG. 17 is a diagram (1) illustrating a process in a state management module.

DESCRIPTION OF EMBODIMENT

Embodiments of a deposit detection device and a deposit detection method disclosed by the subject application will be described in detail below with reference to the accompanying drawings. It should be noted that the present invention is not limited by the embodiments described below.

First, referring to FIG. 1A to FIG. 1E, an overview of the deposit detection method according to an embodiment will be described. FIG. 1A to FIG. 1E are overall explanatory diagrams (1) to (5) of the deposit detection method according to the embodiment.

Figure 1A:
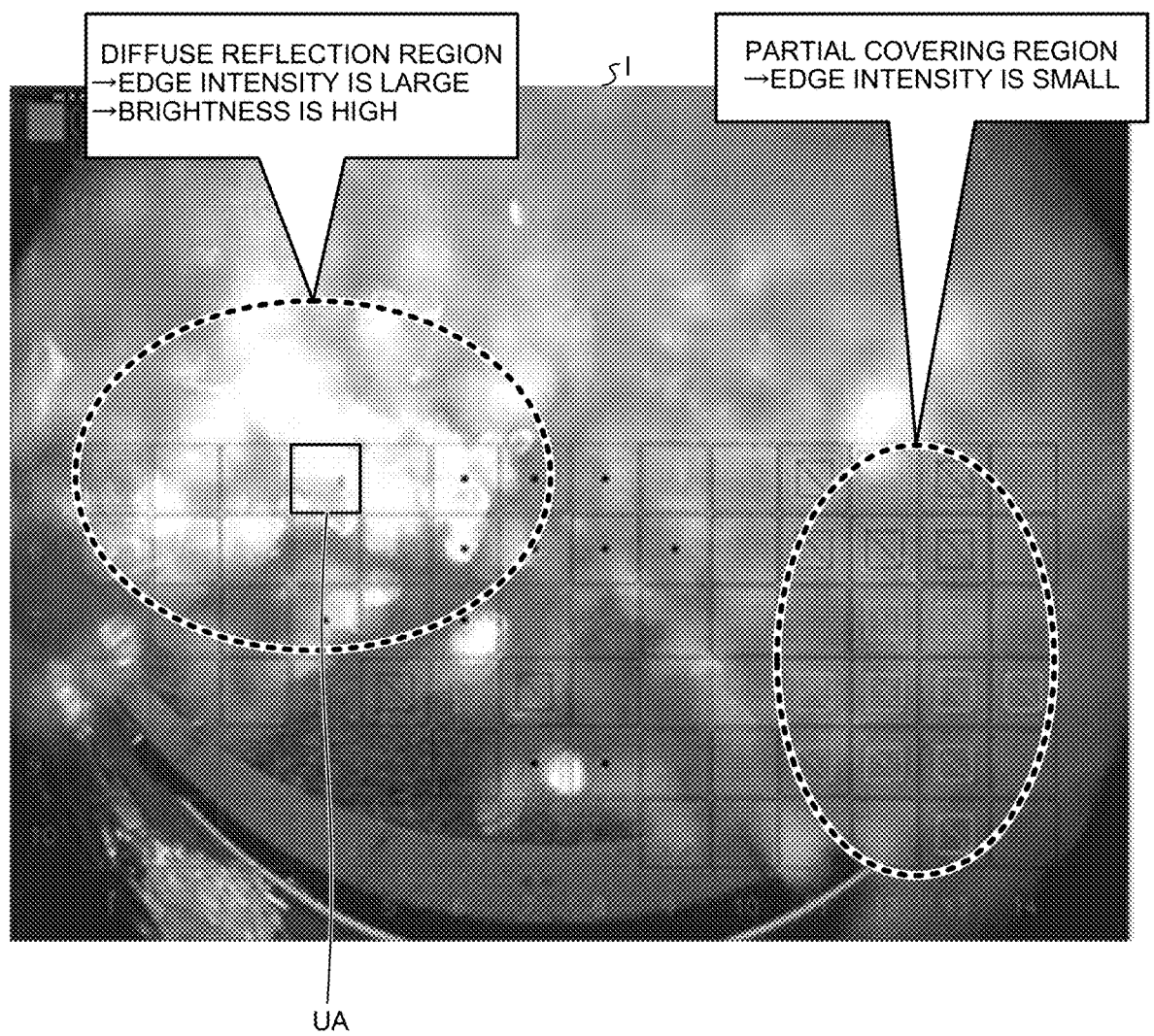
FIG. 1A is an overall explanatory diagram (1) of a deposit detection method according to an embodiment.

As illustrated in FIG. 1A, for example, it is assumed that a captured image I is captured in a state in which snow adheres to a lens surface of an on-vehicle camera. In the following, a description is given as an example in which a deposit detection device 1 (refer to FIG. 2) employing the deposit detection method according to the embodiment detects a state in which most of the lens is covered with snow and brightness change appears to be uneven (hereinafter referred to as "partial covering"), based on a feature amount (which may be referred to as "edge feature amount") related to a brightness gradient of each pixel in the captured image I.

Specifically, the deposit detection device 1 detects partial covering, based on the edge feature amount of each pixel PX (refer to FIG. 4) calculated from the captured image I. The edge feature amount includes an angle feature amount and an intensity feature amount. The angle feature amount is the direction (which hereinafter may be referred to as "edge direction") of an edge vector (brightness gradient) of each pixel PX. The intensity feature amount is the magnitude (which hereinafter may be referred to as "edge intensity") of the edge vector of each pixel PX.

In order to reduce the process load in image processing, the deposit detection device 1 handles such an edge feature amount in a unit of a cell 100 (refer to FIG. 4) composed of a predetermined number of pixels PX. This configuration contributes to reduction in process load in image processing. A unit region UA illustrated in FIG. 1A is a group of such cells 100.

The deposit detection device 1 then calculates a region feature amount that is the feature amount for each unit region UA, based on the edge feature amount calculated for each cell 100. The region feature amount is a statistical feature amount of the edge feature amounts in the unit regions UA and includes, for example, a brightness average, the average of edge intensity, a distribution of edge intensity, the number of pair regions, and the sum of edge intensity of the pair regions. As used herein, the pair region is a combination of cells 100 adjacent to each other and having the edge directions opposite to each other. The deposit detection device 1 detects partial covering for each unit region UA, based on such a region feature amount.

More specifically, the deposit detection device 1 detects a snow adhesion state ("adhere" or "not adhere") in accordance with a predetermined detection condition for partial covering for each unit region UA, based on the calculated region feature amount, in the captured image I. Here, a group of unit regions UA detected as "adhere" is a partial covering region.

Then, for example, if the area ratio of the partial covering region in a predetermined region of interest in the captured image I is equal to or larger than a certain ratio, the deposit detection device 1 determines that most of the lens of the on-vehicle camera is covered and turns on a covering flag. As used herein, the covering flag is a flag indicating whether the lens is covered, and is set to ON when it is determined that the lens is covered and set to OFF when it is determined that the lens is not covered.

For example, when light impinges from the front on the lens covered with snow, a diffuse reflection region may be produced in the captured image I. As illustrated in FIG. 1A, although being a part of the manner of partial covering, such a diffuse reflection region has larger edge intensity and higher brightness than the partial covering region has.

Such a diffuse reflection region therefore is unable to be detected by the aforementioned detection condition for partial covering. Consequently, although most of the lens is covered, portions counted as partial covering regions are reduced and the aforementioned area ratio is reduced, so that the deposit detection device 1 determines that the lens is not covered and turns off the covering flag.

In the deposit detection method according to the embodiment, therefore, the diffuse reflection region is detected under a detection condition different from the detection condition for partial covering. The detection condition for such a diffuse reflection region is a detection condition based on the features of a diffuse reflection region, namely, high brightness and large edge intensity.

Specifically, as illustrated in FIG. 1B, the detection condition for a diffuse reflection region is set based on a variety of elements included in the region feature amount calculated for each unit region UA. The detection condition for a diffuse reflection region is preset, for example, such that the features of high brightness and large edge intensity can be grasped in the unit region UA.

Parameters used for this include, as illustrated in FIG. 1B, the brightness average, the average of edge intensity, the distribution of edge intensity, the number of pair regions, and the sum of edge intensity of the pair regions. Parameters used for suppressing erroneous detection of a region other than a diffuse reflection region include the number of intersections in pattern matching and the sum of the number of times of change in angle classification.

The angle classification corresponds to the edge direction of a cell 100, that is a representative value of the vector directions of pixels PX classified in a predetermined angle range. A calculation process for the edge feature amount and the region feature amount including such an angle classification will be described later with reference to FIG. 3 to FIG. 16.

In the deposit detection method according to the embodiment, a covered state involving diffuse reflection (hereinafter referred to as "diffuse reflection covering") is detected based on the area ratio of the partial covering region detected under the detection condition for partial covering and the diffuse reflection region detected under the detection condition for a diffuse reflection region.

Specifically, as illustrated in FIG. 1C, in the deposit detection method according to the embodiment, when the unit region UA is referred to as "location", the area ratio of the partial covering region described above is interpolated based on a partial covering location group that is the detected partial covering region, a diffuse reflection location group that is the diffuse reflection region, and a covering candidate region that is a covering candidate location group.

More specifically, as illustrated in FIG. 1C, the number of partial covering locations, the number of diffuse reflection locations, and the number of covering candidate locations are added and used as the number of partial covering locations after interpolation. The area ratio of the partial covering region is then calculated based on the number of partial covering locations after interpolation. Only the number of partial covering locations and the number of diffuse reflection locations may be added and used as the number of partial covering locations after interpolation.

The covering candidate location is based on an estimation result of a snow adhesion state obtained based on the position of the region feature amount in a region feature amount space in which the elements of the region feature amount correspond to dimensions. Such an estimation result is obtained as "adhere", "not adhere", "difficult to determine", and the like, and the covering candidate location corresponds to a location estimated as "adhere". Such an estimation process will be described later with reference to FIG. 9 and FIG. 10.

In the deposit detection method according to the embodiment, as illustrated in FIG. 1D, a region of interest (ROI) #1 for detecting normal partial covering and an ROI #2 for detecting diffuse reflection covering are provided in the captured image I. The ROI #2 is set so as to be larger in the height direction than the ROI #1 is such that a diffuse reflection region can be widely grasped.

In such an ROI #2, partial covering locations and diffuse reflection locations are counted individually. In the ROI #1, partial covering locations, diffuse reflection locations, and covering candidate locations are counted individually.

How diffuse reflection looks changes frequently with change in manner of impingement of light. The area ratio of the partial covering region and the diffuse reflection region tends to change frequently with change in manner of impingement of light and is unstable.

In order to compensate for such a point, in the deposit detection method according to the embodiment, state transitions of a variety of states related to detection of diffuse reflection covering are managed. Specifically, as illustrated in FIG. 1E, in the deposit detection method according to the embodiment, the following states related to detection of diffuse reflection covering are provided: (1) other than diffuse reflection covering, (2) diffuse reflection covering preparation, (3) continuous frame counting, (4) diffuse reflection covering, and (5) interpolation of partial covering locations.

The state transitions in which such states make transitions in accordance with a predetermined condition are then managed. This point will be described in detail later with reference to FIG. 17 and subsequent drawings.

A configuration example of the deposit detection device 1 employing the deposit detection method according to the embodiment described above is further specifically described below.

Figure 2:
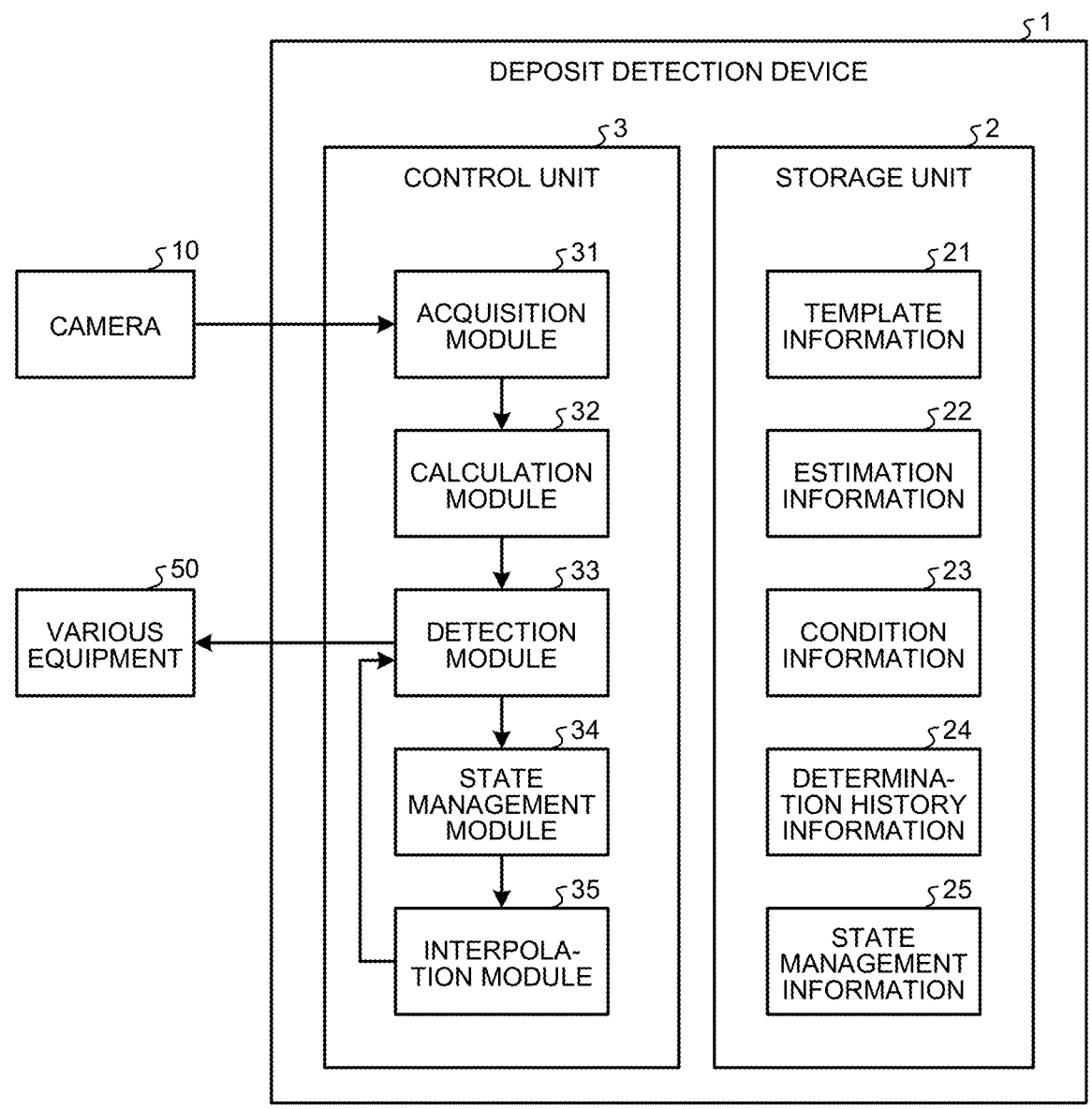
FIG. 2 is a block diagram of a deposit detection device according to the embodiment.

FIG. 2 is a block diagram of the deposit detection device 1 according to the embodiment. In FIG. 2, only the components necessary for explaining the features of the present embodiment are depicted by function blocks, and general components are not illustrated.

In other words, the components illustrated in FIG. 2 are functional and conceptual and are not necessarily physically configured as illustrated in the drawing. For example, a specific manner of distribution and integration of the function blocks is not limited to the one illustrated in the drawing, and all or some thereof may be functionally or physically distributed or integrated in any units, depending on various loads and use situations.

As illustrated in FIG. 2, the deposit detection device 1 according to the embodiment includes a storage unit 2 and a control unit 3. The deposit detection device 1 is connected to a camera 10 and various equipment 50.

Although the deposit detection device 1 illustrated in FIG. 2 is separate from the camera 10 and the various equipment 50, the embodiment is not limited thereto, and the deposit detection device 1 may be integrated with at least one of the camera 10 and the various equipment 50.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front, back, and sides of the vehicle can be captured, and output the captured images I to the deposit detection device 1.

The various equipment 50 acquires the detection result of the deposit detection device 1 to perform a variety of control of the vehicle. The various equipment 50 includes, for example, a display device indicating that a deposit adheres to the lens of the camera 10 and gives an instruction to the user to wipe off the deposit, a removal device that ejects fluid, gas, or the like to the lens to remove a deposit, and a vehicle control device for controlling autonomous driving and the like.

For example, the storage unit 2 is implemented by a semiconductor memory device such as a random-access memory (RAM) and a flash memory or a storage device such as a hard disk and an optical disc and stores template information 21, estimation information 22, condition information 23, determination history information 24, and state management information 25 in the example in FIG. 2.

The template information 21 is information about a template used in a matching process performed by a calculation module 32 described later. The estimation information 22 is information about the region feature amount space in which the elements of the region feature amount described later correspond to dimensions. To put it another way, such estimation information 22 may be an estimation model that allows estimation of an adhesion state based on the region feature amount calculated by the calculation module 32 described later.

The condition information 23 is information about detection conditions used in a detection process performed by a detection module 33 described later and includes, for example, the detection condition for partial covering and the detection condition for a diffuse reflection region described above. The determination history information 24 is information about a determination history of deposit detection in the captured images I of predetermined n frames in the past.

The state management information 25 is information about management of state transitions of various states related to detection of diffuse reflection covering and includes a variety of flags used for the management and a variety of predetermined conditions for the state transitions.

The control unit 3 is a controller and implemented by, for example, a central processing unit (CPU) or a micro processing unit (MPU) executing a variety of computer programs stored in a storage device in the deposit detection device 1 using a RAM as a working area. The control unit 3 may be implemented by, for example, an integrated circuit such as an application-specific integrated circuit (ASIC) and a field-programmable gate array (FPGA).

The control unit 3 includes an acquisition module 31, the calculation module 32, the detection module 33, a state management module 34, and an interpolation module 35 to implement or execute functions and actions of information processing described below.

The acquisition module 31 acquires a captured image I captured by the camera 10. The acquisition module 31 performs a gray-scale process of converting each pixel in the acquired captured image I into grayscale gradation ranging from white to black according to its brightness and performs a smoothing process for each pixel, and outputs the result to the calculation module 32. In the smoothing process, for example, any smoothing filter such as an averaging filter and a Gaussian filter can be used. The gray-scale process and the smoothing process may be omitted.

Figure 3:
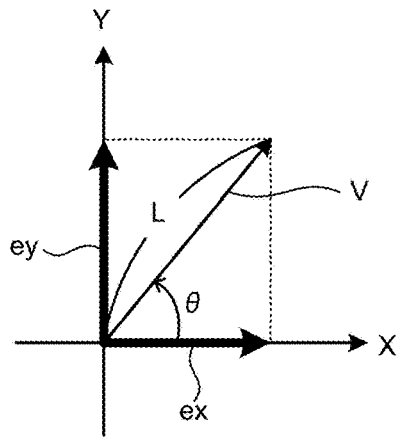
FIG. 3 is a diagram (1) illustrating a process in a calculation module.
Figure 4:
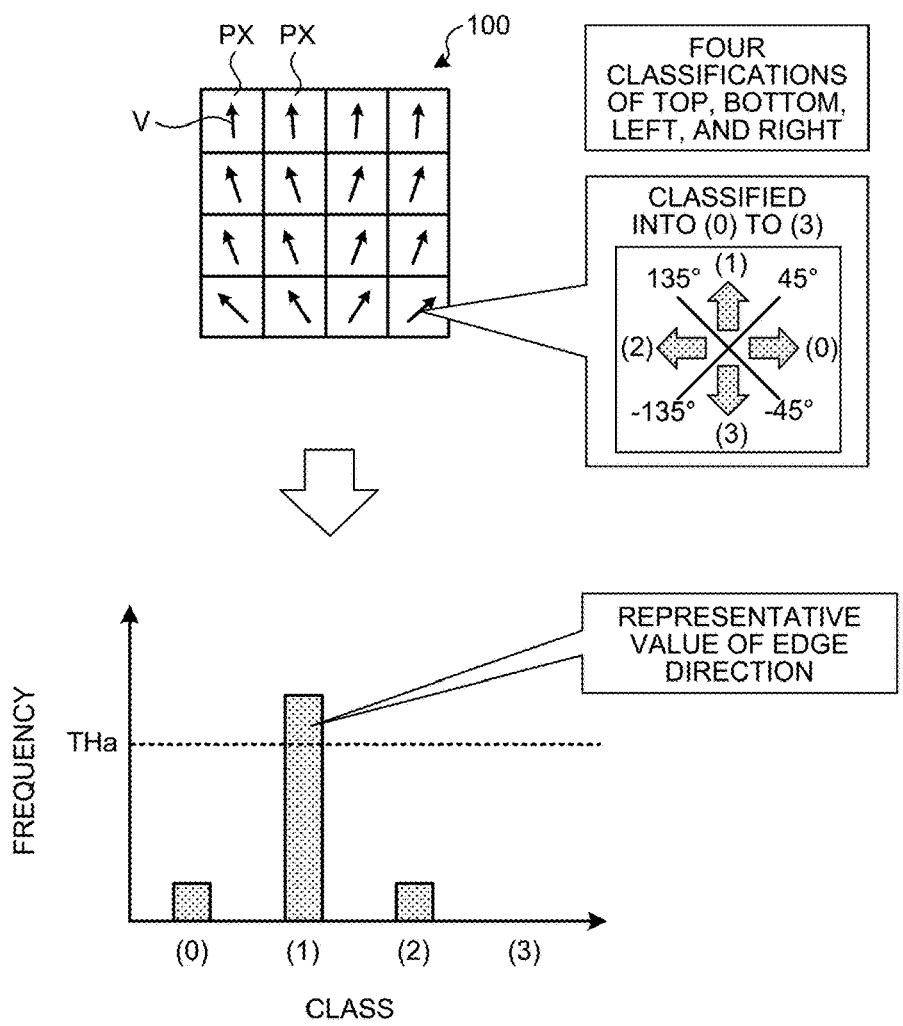
FIG. 4 is a diagram (2) illustrating the process in the calculation module.

The calculation module 32 calculates the edge feature amount for each cell 100 of the captured image I acquired from the acquisition module 31. Referring now to FIG. 3 and FIG. 4, the calculation process for the edge feature amount by the calculation module 32 will be specifically described.

FIG. 3 and FIG. 4 are diagrams (1) and (2) illustrating the process in the calculation module 32. As illustrated in FIG. 3, first, the calculation module 32 performs an edge detection process for each pixel PX and detects the intensity of an edge ex in the X-axis direction (the left-right direction in the captured image I) and the intensity of an edge ey in the Y-axis direction (the top-bottom direction in the captured image I). In the edge detection process, for example, any edge detecting filter such as Sobel filter and Prewitt filter can be used.

Subsequently, the calculation module 32 calculates an edge vector V using the trigonometric functions, based on the detected intensity of the edge ex in the X-axis direction and intensity of the edge ey in the Y-axis direction and calculates an edge direction that is an angle θ formed by the edge vector V and the X axis and an edge intensity that is a length L of the edge vector V.

Subsequently, the calculation module 32 extracts a representative value of the edge direction in the cell 100 based on the calculated edge vector V of each pixel PX. Specifically, as illustrated in the upper section of FIG. 4, the calculation module 32 classifies the edge direction from −180° to 180° of the edge vector V of each pixel PX in the cell 100 into angle classifications (0) to (3) (which hereinafter may be referred to as "four classifications of top, bottom, left, and right") that are top, bottom, left, and right, four directions at every 90°.

More specifically, the calculation module 32 classifies the edge direction of a pixel PX in an angle range from −45° or more to less than 45° into the angle classification (0), classifies the edge direction in an angle range from 45° or more to less than 135° into the angle classification (1), classifies the edge direction in an angle range from 135° or more to less than 180° or −180° or more to less than −135° into the angle classification (2), and classifies the edge direction in an angle range from −135° or more to less than −45° into the angle classification (3).

As illustrated in the lower section of FIG. 4, the calculation module 32 then constructs a histogram in which the angular classifications (0) to (3) each correspond to a class, for each cell 100. When the frequency of the class with the highest frequency is equal to or greater than a predetermined threshold value THa in the constructed histogram, the calculation module 32 extracts the angle classification (in the example in FIG. 4, the angle classification (1)) corresponding to such a class, as a representative value of the edge direction in the cell 100.

The frequency of the aforementioned histogram is calculated by summing up the edge intensity of pixels PX classified in the same angle range, of the pixels PX in the cell 100. Specifically, the frequency of the histogram in the class of the angle classification (0) is examined. For example, it is assumed that there are three pixels PX classified into the angle classification (0) and the edge intensity of the individual pixels PX is 10, 20, and 30. In this case, the frequency of the histogram in the class of the angle classification (0) is calculated such that 10+20+30=60.

The calculation module 32 calculates a representative value of edge intensity of the cell 100, based on the thus calculated histogram. Specifically, such a representative value of edge intensity is set such that when the frequency of the class with the highest frequency in the histogram is equal to or larger than the predetermined threshold value THa, the frequency corresponding to such a class is the edge intensity of the cell 100. To put it another way, the process of calculating a representative value of edge intensity by the calculation module 32 is a process of calculating a feature related to the intensity of an edge in the cell 100, corresponding to the representative value of the edge direction.

On the other hand, when the frequency of the class with the highest frequency is less than the predetermined threshold value THa, the calculation module 32 treats the edge direction of such a cell 100 as "invalid", in other words, "no representative value of the edge direction". This process can prevent a certain edge direction from being calculated as a representative value when the edge directions of the pixels PX vary greatly.

The process in the calculation module 32 illustrated in FIG. 3 and FIG. 4 is only an example, and any process that can calculate the representative value of the edge direction may be employed. For example, the average value of the edge directions of the pixels PX in the cell 100 may be calculated and one of the angle classifications (0) to (3) corresponding to such an average value may be used as a representative value of the edge direction.

Although FIG. 4 illustrates a case where 4×4, that is, 16 pixels PX in total form one cell 100, the number of pixels PX in the cell 100 may be set as desired and the number of pixels PX in the top-bottom direction and the left-right direction may be different, such as 3×5.

Returning back to the description of FIG. 2, the calculation module 32 also calculates the region feature amount for each unit region UA, based on the calculated edge feature amount for each cell 100.

First of all, the calculation module 32 calculates the brightness average in each unit region UA and the average and the distribution of edge intensity of the cells 100, as the region feature amount. The calculation module 32 also calculates the number of pair regions 200 and the sum of edge intensity of the pair regions 200, as the region feature amount.

Figure 5:
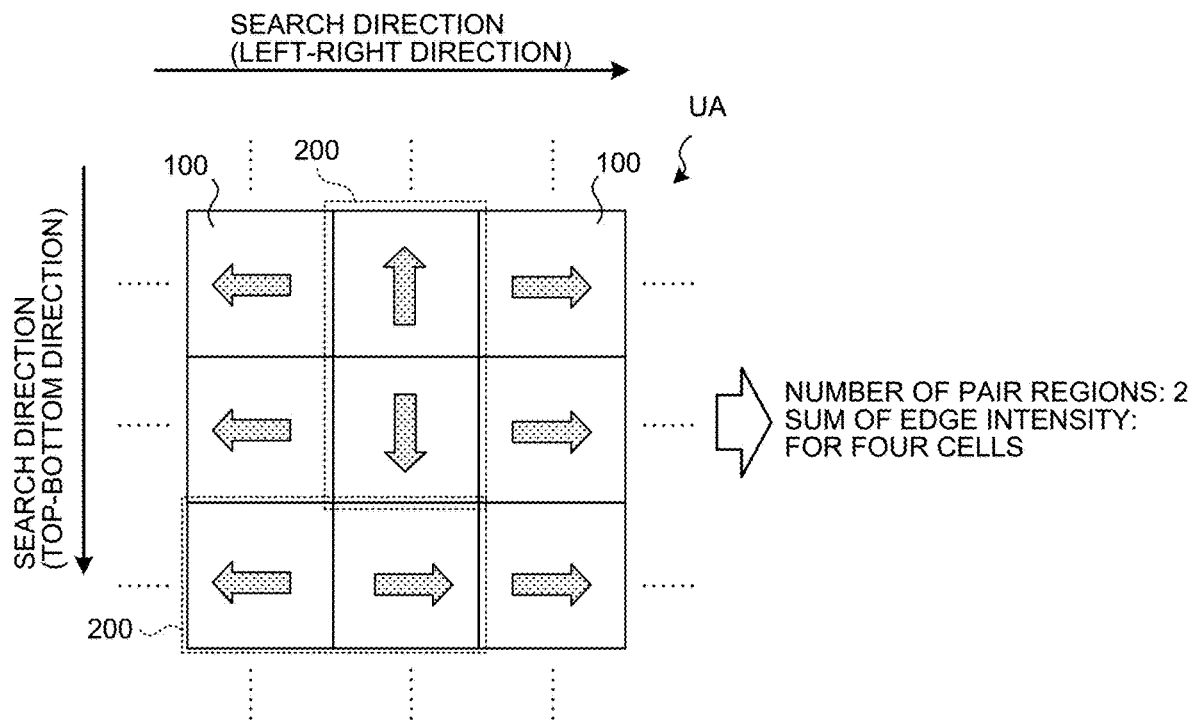
FIG. 5 is a diagram (3) illustrating the process in the calculation module.
Figure 6:
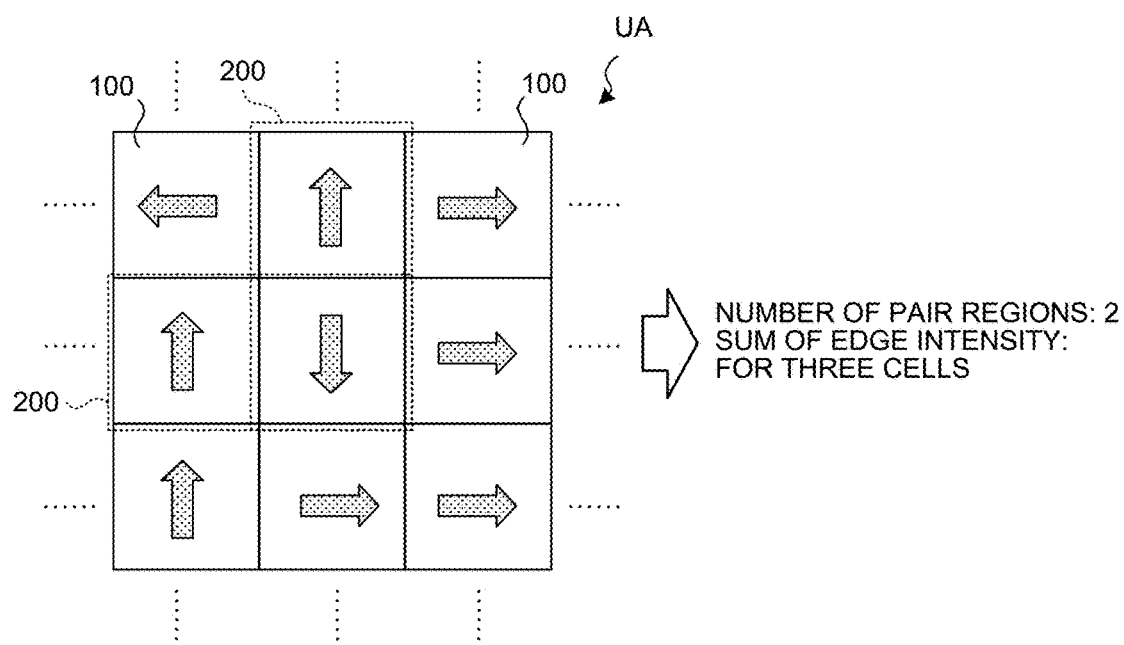
FIG. 6 is a diagram (4) illustrating the process in the calculation module.

The calculation of the number of pair regions 200 and the sum of edge intensity of the pair regions 200 will now be described with reference to FIG. 5 and FIG. 6. FIG. 5 and FIG. 6 are diagrams (3) and (4) illustrating the process in the calculation module 32.

FIG. 5 illustrates a case where two pair regions 200 do not share a cell 100, and FIG. 6 illustrates a case where two pair regions 200 share a cell 100.

As illustrated in FIG. 5, the calculation module 32 scans in the left-right direction and the top-bottom direction a plurality of cells 100 arranged in the left-right direction and the top-bottom direction of a unit region UA to search for a pair region 200. That is, the calculation module 32 extracts, as a pair region 200, cells 100 adjacent to each other and having the edge directions opposite to each other from among cells 100 in the unit region UA.

The calculation module 32 then calculates the number of extracted pair regions 200 and the sum of edge intensity of the pair regions 200. As illustrated in FIG. 5, for example, when the extracted two pair regions 200 do not share a cell 100, the calculation module 32 calculates the number of pair regions 200 as two and calculates the sum of edge intensity as the value obtained by summing the edge intensity of four cells 100 included in the two pair regions 200.

As illustrated in FIG. 6, for example, when the extracted two pair regions 200 share a cell 100, the calculation module 32 calculates the number of pair regions 200 as two and calculates the sum of edge intensity as the value obtained by summing the edge intensity of three cells 100 included in the two pair regions 200.

The calculation module 32 may calculate the region feature amount by allocating representative values of two or more kinds of edge directions for one cell 100, based on not only the angle classifications of "four classifications of top, bottom, left, and right" described above but also angle classifications of "four diagonal classifications", for example. This point will be described with reference to FIG.

7 and FIG. 8. FIG. 7 and FIG. 8 are diagrams (5) and (6) illustrating the process in the calculation module 32.

When "four classifications of top, bottom, left, and right" is set as a first angle classification and a representative value of the edge direction based on this is set as a first representative value, as illustrated in FIG. 7, the calculation module 32 may set "four diagonal classifications" as a second angle classification and calculate a representative value of the edge direction based on this as a second representative value.

In this case, the calculation module 32 classifies the edge direction from −180° to 180° of the edge vector V of each pixel PX in a cell 100 into angle classifications (4) to (7) that are four diagonal directions at every 90° according to the second angle classification.

More specifically, the calculation module 32 classifies an edge direction of a pixel PX in an angle range from 0° or more to less than 90° into the angle classification (4), classifies an edge direction in an angle range from 90° or more to less than 180° into the angle classification (5), classifies an edge direction in an angle range from −180° or more to less than −90° into the angle classification (6), and classifies an edge direction in an angle range from −90° or more to less than 0° into the angle classification (7).

The calculation module 32 then constructs a histogram in which the angular classifications (4) to (7) correspond to classes, for each cell 100, in the same manner as illustrated in the lower section of FIG. 4. When the frequency of the class with the highest frequency is equal to or greater than the predetermined threshold value THa in the constructed histogram, the calculation module 32 uses the angle classification corresponding to such a class to calculate the second representative value of the edge direction in the cell 100.

As illustrated in FIG. 8, two representative values of the edge direction thus can be allocated to one cell 100. Then, as illustrated in FIG. 8, when at least one of the first representative value and the second representative value in adjacent cells 100 is opposite to the corresponding one cell 100, the calculation module 32 extracts such adjacent cells 100 as a pair region 200.

That is, the calculation module 32 calculates the first representative value and the second representative value of edge directions in each cell 100, thereby allowing extraction of a pair region 200 that fails to be extracted with the edge direction of only one kind.

For example, for a pixel PX having an edge direction of 140° and a pixel PX having an edge direction of −40°, their directions are not opposite in the first angle range but are opposite in the second angle range, whereby change in edge direction in cells 100 can be detected with higher accuracy.

The calculation module 32 allows the detection module 33 described later to map the thus calculated region feature amount for each unit region UA into the region feature amount space in which the elements of the region feature amount correspond to dimensions and to estimate an adhesion state of snow that is a deposit, based on the position of the region feature amount in the region feature amount space.

Figure 9:
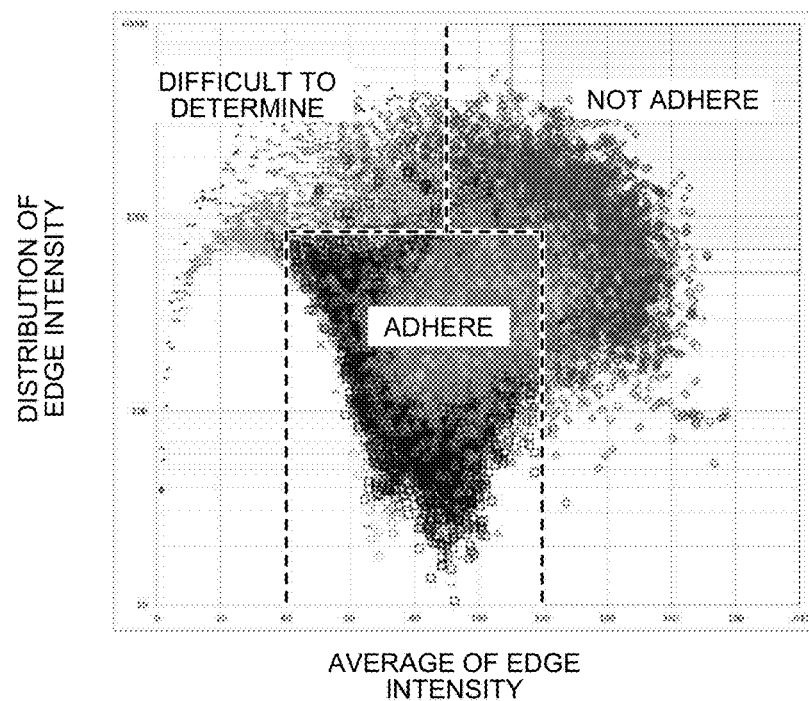
FIG. 9 is a diagram (7) illustrating the process in the calculation module.
Figure 10:
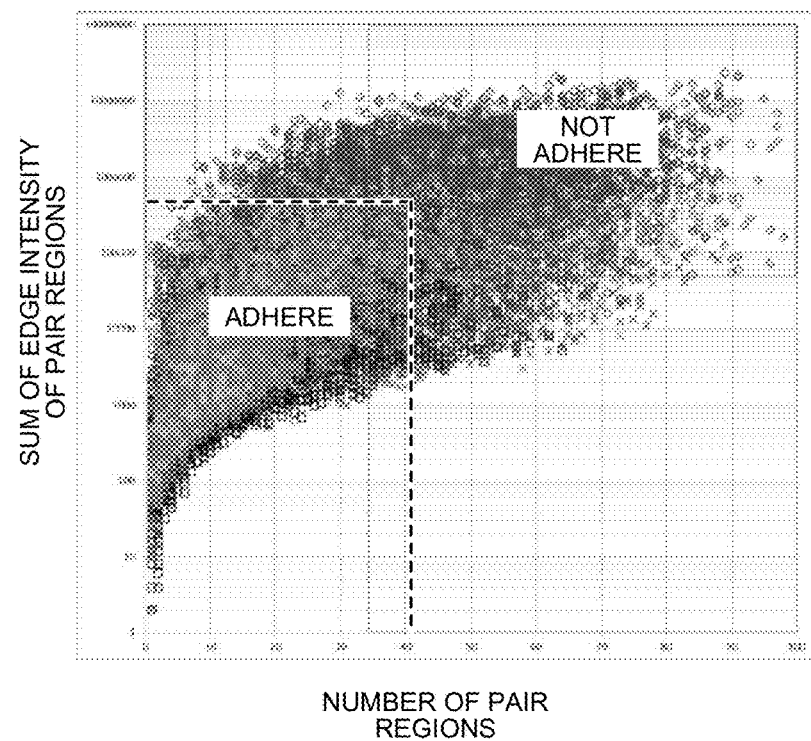
FIG. 10 is a diagram (8) illustrating the process in the calculation module.

This point will be described with reference to FIG. 9 and FIG. 10. FIG. 9 and FIG. 10 are diagrams (7) and (8) illustrating the process in the calculation module 32.

For example, as illustrated in FIG. 9, the calculation module 32 allows the adhesion state of snow to be estimated as one of "adhere", "not adhere", and "difficult to determine", based on the position in a two-dimensional space in which the average of edge intensity and the distribution of edge intensity correspond to dimensions.

For example, as illustrated in FIG. 10, the calculation module 32 allows the adhesion state of snow to be estimated as one of "adhere" and "not adhere", based on the position in a two-dimensional space in which the number of pair regions 200 and the sum of edge intensity of the pair regions 200 correspond to dimensions.

As used herein, "adhere" is a state in which the background is hidden and covered with snow. "Not adhere" is a state in which the background is visible. "Difficult to determine" is an invisible state due to blown-out highlights or the like.

In the examples of the region feature amount spaces illustrated in FIG. 9 and FIG. 10, the region feature amounts of unit regions UA of sample data are calculated in advance based on a large amount of sample data of the captured image I and mapped into each space with sample dots colored differently according to the actual adhesion states. The threshold values (refer to the dotted lines in the drawings) that delimit the adhesion states are defined, for example, by the difference between the colors of the sample dots. Although the threshold values are defined by delimitation with straight lines in FIG. 9 and FIG. 10 for convenience of explanation, they may be defined by a curve having a shape conforming to the difference between the colors of the sample dots.

For example, in the state of "not adhere", relatively many pair regions 200 are extracted due to a white line on a road, a guardrail, the outline of a building, and the like, and the edge intensity of the cells 100 is large. Thus, the sum of edge intensity of the pair regions 200 is also relatively large. On the other hand, in the state of "adhere", since the brightness of the unit regions UA is uniform and the edge intensity of the cells 100 is small, the number of extracted pair regions 200 is relatively small and the sum of edge intensity of the pair regions 200 is relatively small.

In view of such a point, as illustrated in FIG. 10, a region feature amount space in which the number of pair regions 200 and the sum of edge intensity of the pair regions 200 correspond to dimensions is generated in advance based on the sample data of the captured images I, and the calculated region feature amount is mapped into such a space, whereby the adhesion state of a deposit for each unit region UA can be estimated as one of "adhere" and "not adhere" based on the position therein.

The average of edge intensity and the distribution of edge intensity illustrated in FIG. 9 are based on a statistical point of view. In other words, the average and the distribution of edge intensity corresponding to the actual adhesion state for each unit region UA are learned based on a large amount of sample data, and a state is determined based on the result of such learning.

In view of such a point, as illustrated in FIG. 9, a region feature amount space in which the average of edge intensity and the distribution of edge intensity correspond to dimensions is generated in advance based on the sample data of the captured images I, and the calculated region feature amount is mapped into such a space, whereby the adhesion state of a deposit for each unit region UA can be estimated as one of "adhere", "not adhere", and "difficult to determine", based on the position therein.

The calculation module 32 according to the embodiment therefore can improve the accuracy in deposit detection.

The calculation module 32 also calculates the number of intersections in pattern matching as a region feature amount. The calculation of the number of intersections in pattern matching will now be described with reference to FIG. 11 to FIG. 14.

Figure 11:
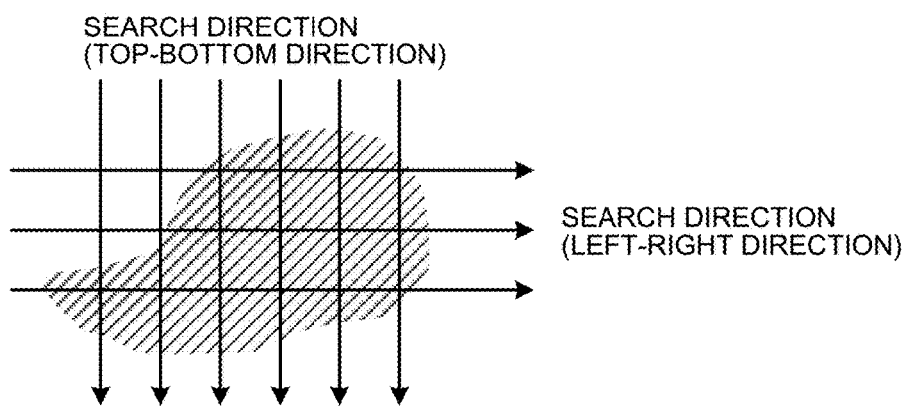
FIG. 11 is a diagram (9) illustrating the process in the calculation module.
Figure 12:
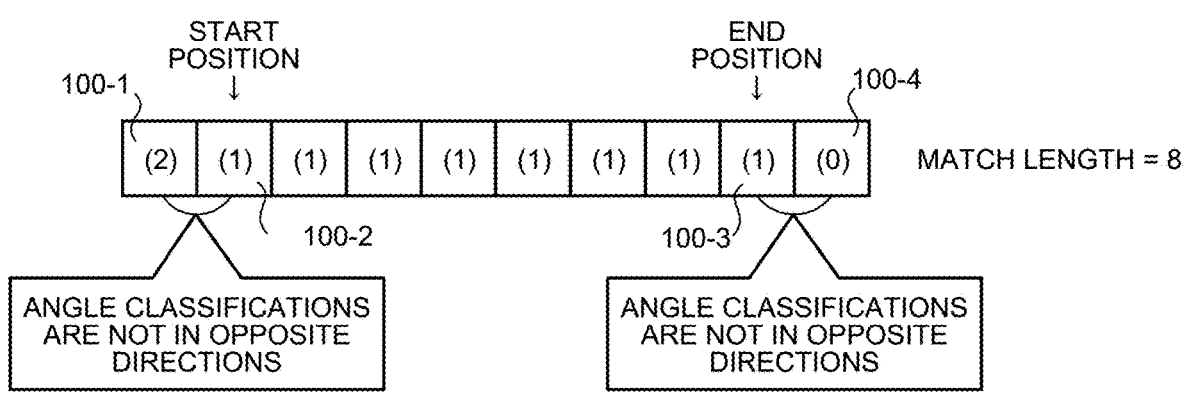
FIG. 12 is a diagram (10) illustrating the process in the calculation module.
Figure 13:
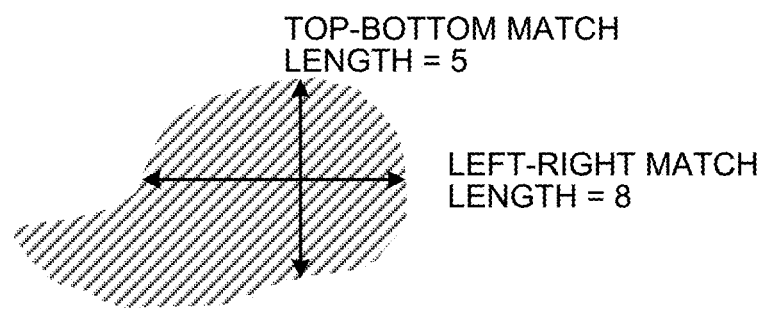
FIG. 13 is a diagram (11) illustrating the process in the calculation module.
Figure 14:
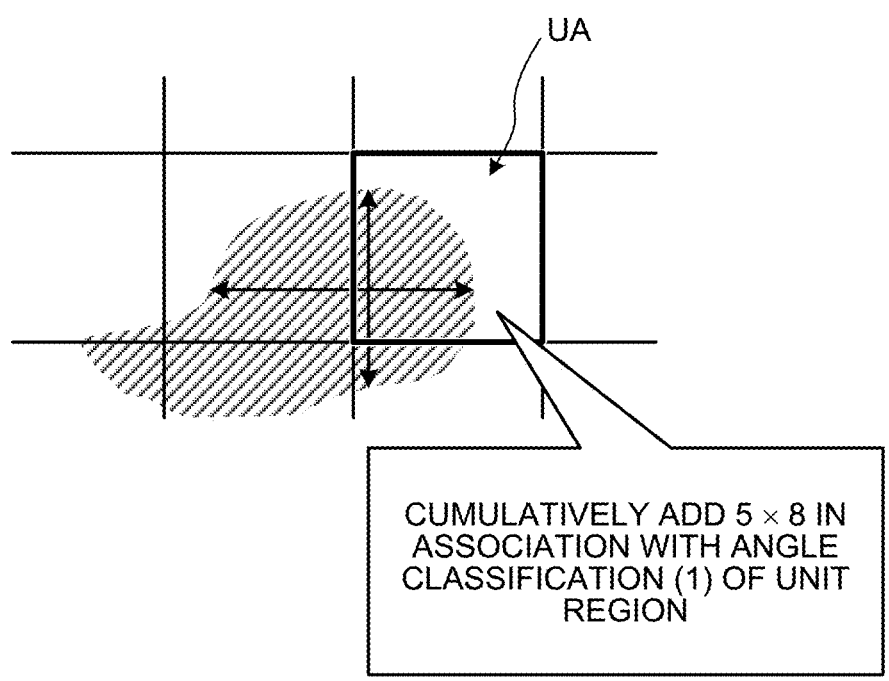
FIG. 14 is a diagram (12) illustrating the process in the calculation module.

FIG. 11 to FIG. 14 are diagrams (9) to (12) illustrating the process in the calculation module 32. It is assumed that the hatched portion having an amorphous shape illustrated in FIG. 11, FIG. 13, and FIG. 14 is a pattern portion having a predetermined edge feature amount in the captured image I.

The calculation module 32 searches for a predetermined search pattern that matches a predetermined template, using the edge direction of the calculated edge feature amount of a cell 100. As illustrated in FIG. 11, the search directions are the left-right direction and the top-bottom direction.

For example, the calculation module 32 searches for a search pattern under a condition that "angle classifications in opposite directions do not appear on both sides of the angle classification of interest". Specifically, when the angle classification of interest is the angle classification (1) and a search is performed in the left-right direction, as illustrated in FIG. 12, for example, the start position is a cell 100-2 that is in the angle classification (1) and adjacent to a cell 100-1 with the angle classification (2) in which "the angle classification is not in the opposite direction".

Then, a sequence of the angle classification (1) continues, and when a cell 100-4 with the angle classification (0) in which "the angle classification is not in the opposite direction" appears, a cell 100-3 that is in the angle classification (1) and adjacent to such a cell 100-4 is the end position. In this case, the match length is "8" in the example in FIG. 12. When there is a match with a search pattern in this way, the calculation module 32 holds the position and the match length.

When there is a match with the search pattern illustrated in FIG. 12, a brightness change between adjacent classifications of the four angle classifications is observed at the start position and the end position.

As illustrated in FIG. 13, when the matches with the search pattern intersect in the left-right direction and the top-bottom direction, the calculation module 32 then cumulatively adds the product of the horizontal match length and the top-bottom match length for each angle classification, as stored information corresponding to the unit region UA corresponding to the intersection.

Specifically, in the case of the example in FIG. 12 and FIG. 13, the calculation module 32 cumulatively adds 5×8 in association with the angle classification (1) of the unit region, as illustrated in FIG. 14. Although not illustrated in the drawings, the calculation module 32 also cumulatively adds the number of intersections similarly in association with the angle classification (1) of the unit region.

Such a matching process is repeated, and the detection module 33 described later determines the adhesion state of the unit region UA as "adhere", for example, when three or more of the cumulative addition results associated with the angle classifications (0) to (3) of the unit region UA are equal to or larger than a predetermined threshold value, based on a predetermined detection condition. If such a determination condition is not satisfied, it is determined to be "not adhere". The matching process illustrated in FIG. 11 to FIG. 14 is only an example and is not intended to limit the process.

The calculation module 32 also calculates the sum of the number of times of change in angle classification, as the region feature amount. The calculation of the sum of the number of times of change in angle classification will now be described with reference to FIG. 15 and FIG. 16. FIG. 15 and FIG. 16 are diagrams (13) and (14) illustrating the process in the calculation module 32.

As illustrated in FIG. 15, the calculation module 32 calculates, for each unit region UA of an angle-classification image, the number of times of change in angle classification of the cells 100 arranged in the unit region UA in the left-right direction and the top-bottom direction.

Specifically, as illustrated in FIG. 15, it is assumed that there is a sequence of cells 100-1, 100-2, 100-3, and 100-4 and the angle classifications that are edge directions are (0), (1), (1), and (2) in order.

In this case, since the angle classification changes from (0) to (1) in scanning the cell 100-1 to the cell 100-2, the calculation module 32 adds +1 to the number of times of change of each of the angle classifications (0) and (1). In the same sequence, since the angle classification changes from (1) to (2) in scanning the cell 100-3 to the cell 100-4, the calculation module 32 adds +1 to the number of times of change of each of the angle classifications (1) and (2).

The calculation module 32 thus counts the number of times of change in angle classification of the cells 100 for each unit region UA and, as illustrated in FIG. 16, calculates the sum of the number of times of change of each angle classification, in each of "four classifications of top, bottom, left, and right" and "four diagonal classifications".

Returning back to the description of FIG. 2, the calculation module 32 outputs the calculated region feature amount for each unit region UA to the detection module 33.

The detection module 33 detects an adhesion state for each unit region UA, in accordance with a predetermined detection condition included in the condition information, based on the region feature amount for each unit region UA calculated by the calculation module 32.

Specifically, the detection module 33 detects a partial covering location, based on the detection condition for partial covering. The detection module 33 also detects a diffuse reflection location, based on the detection condition for a diffuse reflection region. The detection module 33 also detects a covering candidate location, based on the estimation information 22. The detection module 33 outputs the detection result to the state management module 34. The detection module 33 also notifies the various equipment 50 of the detection result reflecting the interpolation result obtained by the interpolation module 35 described later.

The state management module 34 manages the state transitions of the states related to detection of diffuse reflection covering, based on the detection result of the detection module 33 and the state management information 25. Such a management process will now be described with reference to FIG. 17 and FIG. 18.

Figure 18:
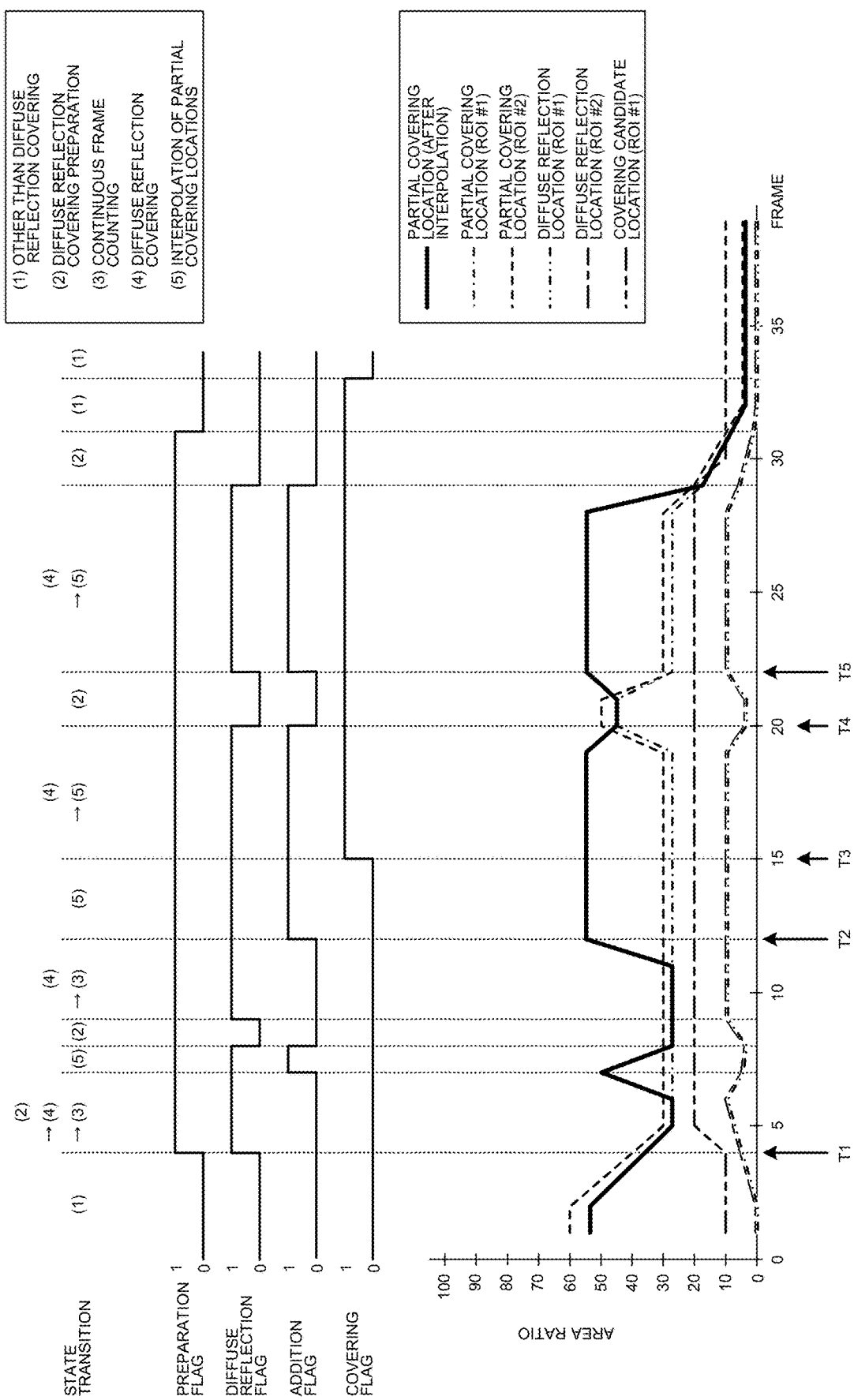
FIG. 18 is a diagram (2) illustrating the process in the state management module.

FIG. 17 and FIG. 18 are diagrams (1) and (2) illustrating the process in the state management module 34. Hereinafter, the states related to detection of diffuse reflection covering may be represented merely by numerals in parentheses, such as (1) to (5).

As illustrated in FIG. 17, the state transition from (1) other than diffuse reflection covering to (2) diffuse reflection covering preparation is performed when a condition that partial covering locations make up 25% or more and diffuse reflection locations make up 6% or more to less than 25% is satisfied. The state transition from (2) diffuse reflection covering preparation to (4) diffuse reflection covering is performed when a condition that diffuse reflection locations make up 6% or more to less than 25% is satisfied.

The state transition from (4) diffuse reflection covering to (3) continuous frame counting is performed when the covering flag is off. The state transition from (4) diffuse reflection covering to (5) interpolation of partial covering locations is performed when the covering flag is on.

The state transition from (3) continuous frame counting to (5) interpolation of partial covering locations is performed when a diffuse reflection flag is on successively in three frames or more. As used herein, the diffuse reflection flag is a flag indicating whether diffuse reflection occurs, and is turned on when diffuse reflection locations make up 6% or more and turned off when diffusion reflection locations make up less than 6%.

The state transition from the state (3) or (5) to (2) is performed when diffuse reflection locations make up less than 6%. The state transition from the state (2), (3), (4) or (5) to (1) is performed when partial covering locations make up less than 10%.

FIG. 18 is a timing chart based on the description of FIG. 17. As used herein, a preparation flag is a flag indicating whether diffuse reflection covering can be detected, and is turned on when the state transition to (2) diffuse reflection covering preparation is performed. When the preparation flag is turned on, the on state is kept until partial covering locations make up less than 10%.

An addition flag is a flag indicating an execution state of the addition process illustrated in FIGS. 1C and 1s turned on if the diffuse reflection flag is on successively in three frames or more when the covering flag is off. The addition flag is synchronized with the diffuse reflection flag when the covering flag is on. When the addition flag is turned on, the addition process illustrated in FIG. 1C is performed.

Based on the foregoing, as can be understood from FIG. 18, a state transition to (2) is made at timing T1 and after the preparation flag is turned on, every time three or more frames having at least a predetermined number of diffuse reflection locations are counted successively in (3), a state transition to (5) is made and the addition process for interpolation of the partial covering location is performed.

At timing T2, the on condition for the covering flag is satisfied and the covering flag is turned on, and then at timing T3, the diffuse reflection location is temporarily reduced and the diffuse reflection flag and the addition flag are turned off to interrupt the addition process, but if the diffuse reflection location increases at timing T4, the addition flag is turned on at timing T5 in synchronization with the diffuse reflection flag, and the addition process is promptly resumed.

Then, with reduction in diffuse reflection location, the addition process is terminated and a state transition from (2) to (1) is finally made, the preparation flag is turned off, and then detection of diffuse reflection covering becomes a standby state until the diffuse reflection location satisfies the on condition for the preparation flag next time.

Returning back to the description of FIG. 2, the state management module 34 notifies the interpolation module 35 of the on timing and the off timing of the addition flag. The interpolation module 35 starts the addition process illustrated in FIG. 1C, based on the on timing notified from the state management module 34, and interpolates the area ratio of the partial covering locations.

The interpolation module 35 notifies the detection module 33 of the interpolation result including the area ratio after interpolation. The interpolation module 35 suspends the addition process, based on the off timing notified from the state management module 34, and waits until the next on timing.

Referring now to FIG. 19 to FIG. 22, a process procedure performed by the deposit detection device 1 according to the embodiment will be described. FIG. 19 to FIG. 22 are flowcharts (1) to (4) illustrating the process procedure performed by the deposit detection device 1 according to the embodiment. In FIG. 19 to FIG. 22, the process procedure for the captured image I of one frame is illustrated.

Figure 19:
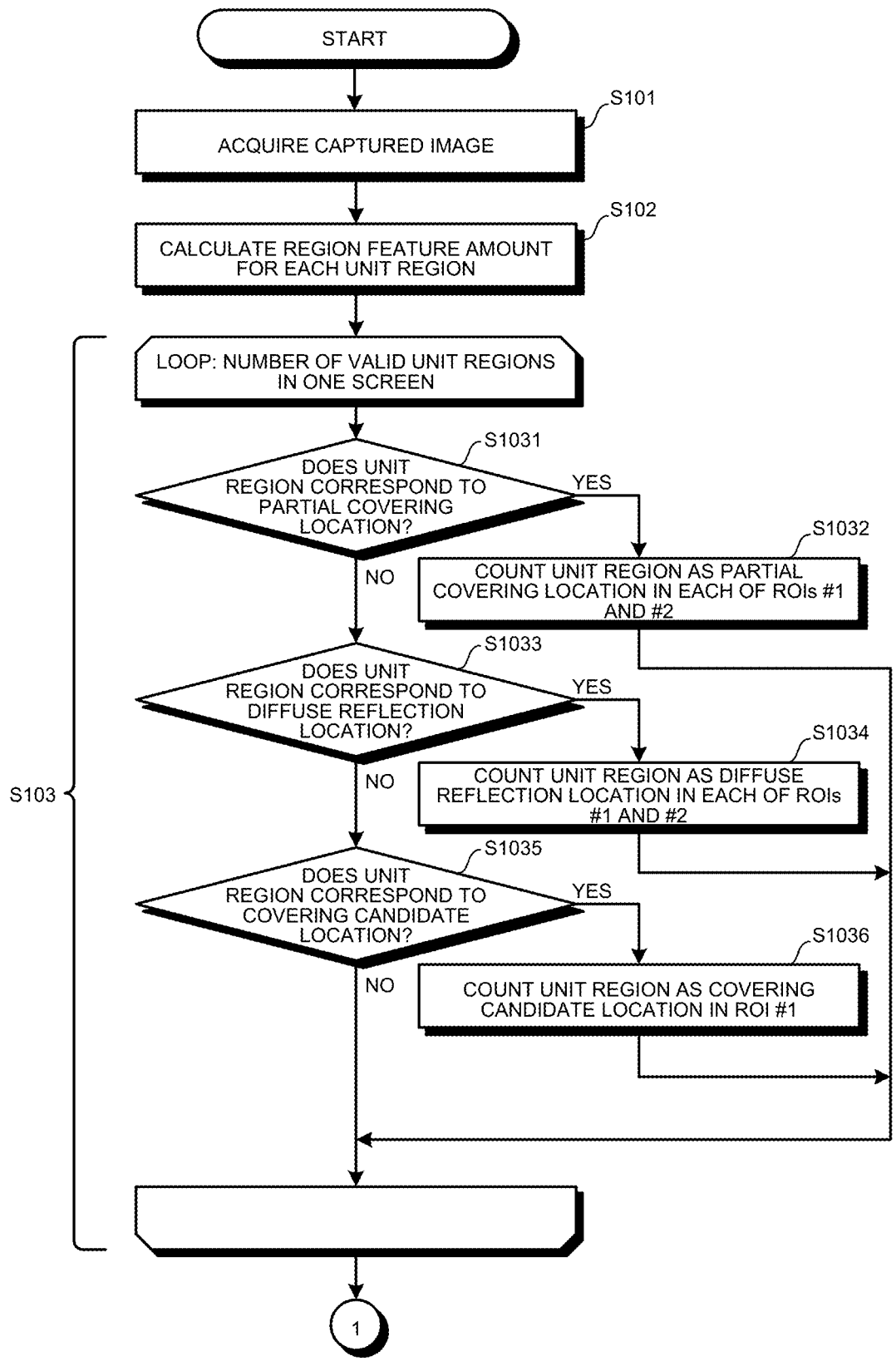
FIG. 19 is a flowchart (1) illustrating a process procedure performed by the deposit detection device according to the embodiment.

First of all, as illustrated in FIG. 19, the acquisition module 31 acquires a captured image I (step S101). In addition, the acquisition module 31 performs the gray-scale process and the smoothing process for the captured image I.

Subsequently, the calculation module 32 calculates the edge feature amount for each cell 100 of the captured image I and calculates the region feature amount for each unit region UA, based on the calculated edge feature amount (step S102).

The detection module 33 then detects each of a partial covering location, a diffuse reflection location, and a covering candidate location while looping for the number of valid unit regions in one screen (step S103). The valid unit regions are, for example, unit regions UA other than unnecessary unit regions corresponding to the body of the vehicle and the like included in the captured image I.

Specifically, the detection module 33 refers to the detection condition for partial covering and, if the unit region UA being processed corresponds to the partial covering location (Yes at step S1031), counts the unit region UA as a partial covering location in each of the ROIs #1 and #2 (step S1032). If the unit region UA being processed does not correspond to the partial covering location (No at step S1031), the process proceeds to step S1033.

At step S1033, the detection module 33 refers to the detection condition for the diffuse reflection region and, if the unit region UA being processed corresponds to the diffuse reflection location (Yes at step S1033), counts the unit region UA as a diffuse reflection location in each of the ROIs #1 and #2 (step S1034). If the unit region UA being processed does not correspond to the diffuse reflection location (No at step S1033), the process proceeds to step S1035.

At step S1035, the detection module 33 refers to the estimation information 22 and, if the unit region UA being processed corresponds to the covering candidate location (Yes at step S1035), counts the unit region UA as a covering candidate location in the ROI #1 (step S1036). If the unit region UA being processed does not correspond to the covering candidate location (No at step S1035), the loop of step S103 is repeated.

Figure 20:
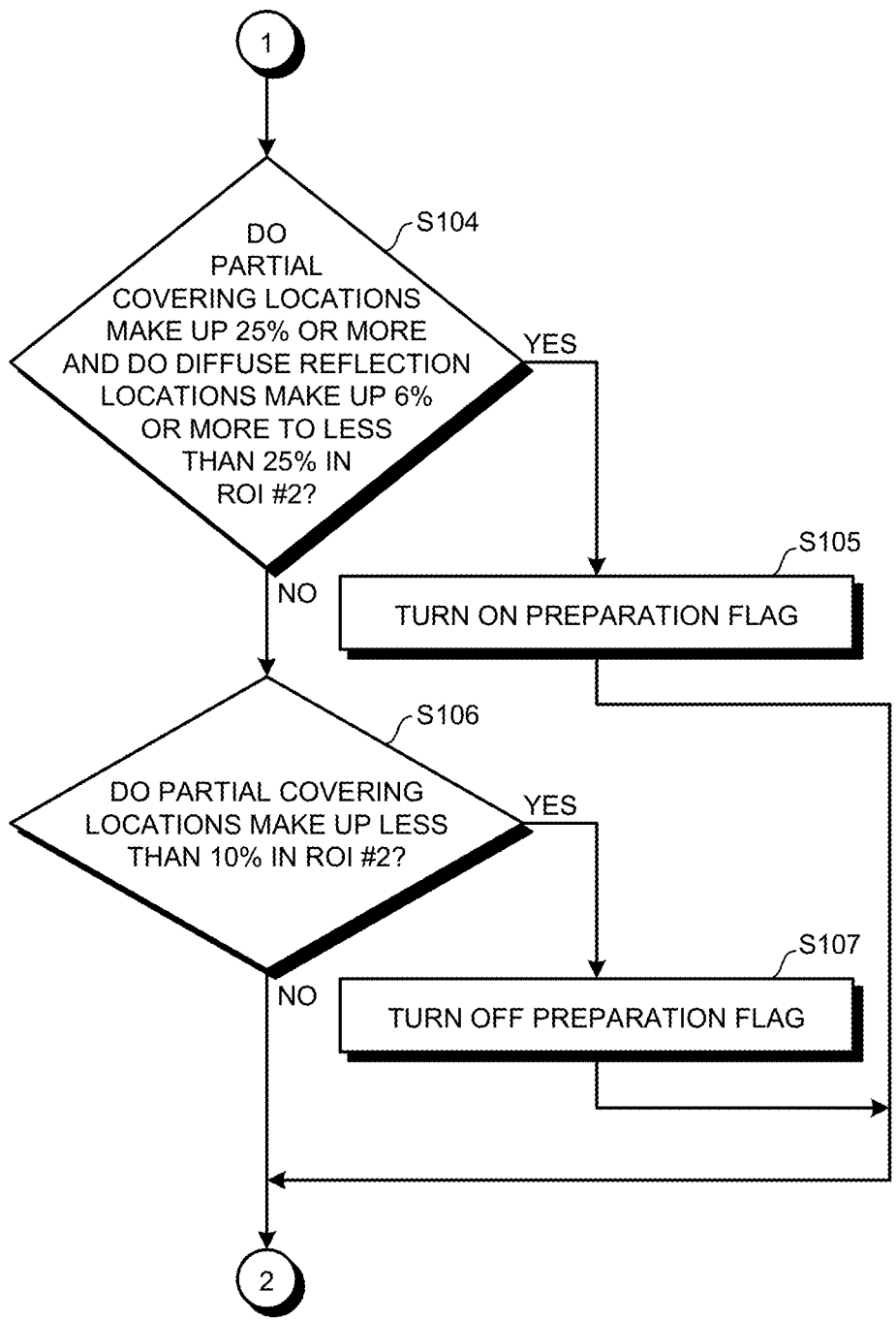
FIG. 20 is a flowchart (2) illustrating the process procedure performed by the deposit detection device according to the embodiment.

Subsequently, as illustrated in FIG. 20, the state management module 34 determines whether partial covering locations make up 25% or more and diffuse reflection locations make up 6% or more to less than 25% in the ROI #2 (step S104). Here, if this condition is satisfied (Yes at step S104), the state management module 34 turns on the preparation flag (step S105) and proceeds to step S108 in FIG. 21.

If the condition is not satisfied (No at step S104), the state management module 34 determines whether partial covering locations make up less than 10% in the ROI #2 (step S106). Here, if this condition is satisfied (Yes at step S106), the state management module 34 turns off the preparation flag (step S107) and proceeds to step S108 in FIG. 21.

Figure 21:
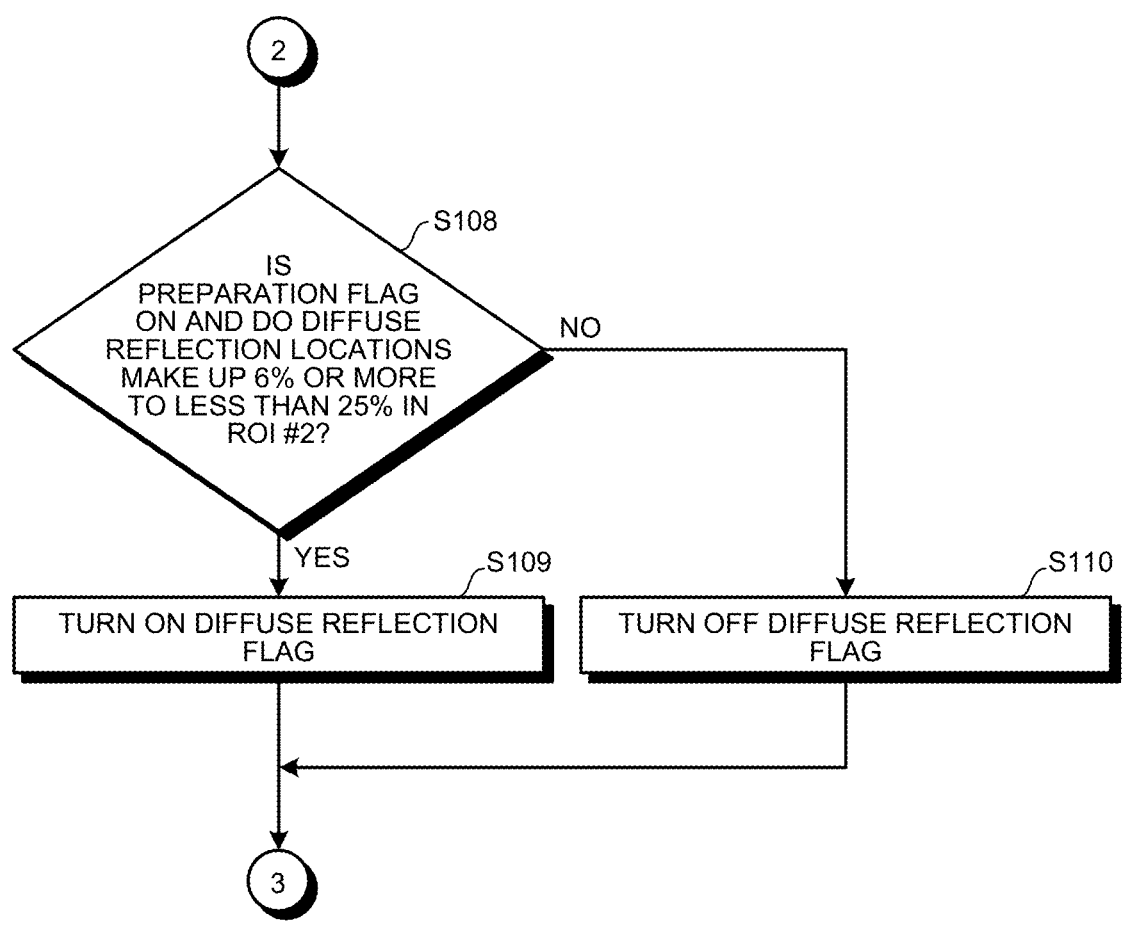
FIG. 21 is a flowchart (3) illustrating the process procedure performed by the deposit detection device according to the embodiment.

If this condition is not satisfied (No at step S106), the process also proceeds to step S108 in FIG. 21.

Subsequently, as illustrated in FIG. 21, the state management module 34 determines whether the preparation flag is on and diffuse reflection locations make up 6% or more to less than 25% in the ROI #2 (step S108). Here, if this condition is satisfied (Yes at step S108), the state management module 34 turns on the diffuse reflection flag (step S109) and proceeds to step S111 in FIG. 22.

Figure 22:
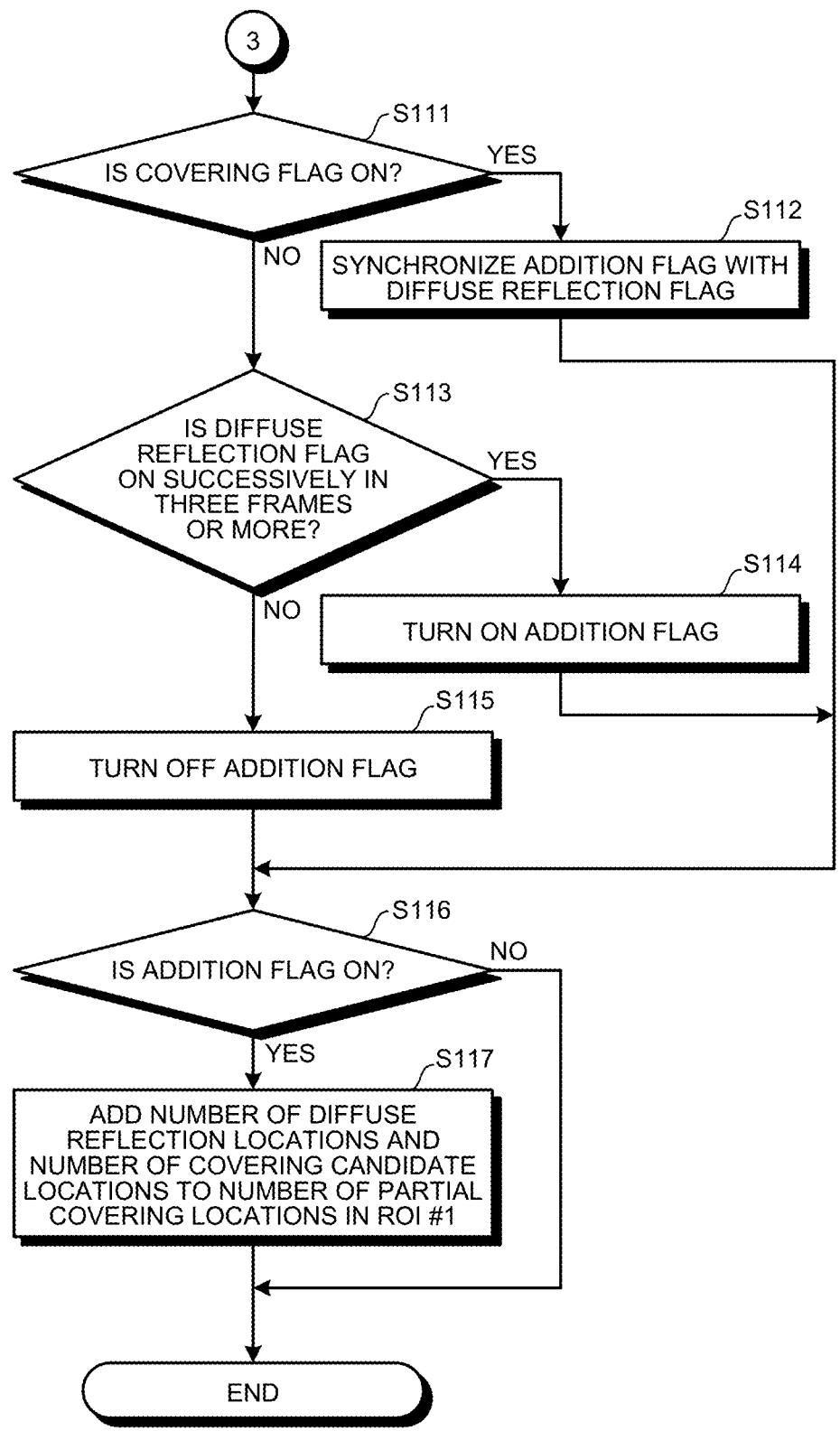
FIG. 22 is a flowchart (4) illustrating the process procedure performed by the deposit detection device according to the embodiment.

If this condition is not satisfied (No at step S108), the state management module 34 turns off the diffuse reflection flag (step S110) and proceeds to step S111 in FIG. 22.

Subsequently, as illustrated in FIG. 22, the state management module 34 determines whether the covering flag is on (step S111). Here, if the covering flag is on (Yes at step S111), the state management module 34 synchronizes the addition flag with the diffuse reflection flag (step S112) and proceeds to step S116.

If the covering flag is not on (No at step S111), the state management module 34 determines whether the diffuse reflection flag is on successively in three frames or more (step S113).

Here, if the diffuse reflection flag is on successively in three frames or more (Yes at step S113), the state management module 34 turns on the addition flag (step S114) and proceeds to step S116.

If the diffuse reflection flag is not on successively in three frames or more (No at step S113), the state management module 34 turns off the addition flag (step S115) and proceeds to step S116.

The state management module 34 then determines whether the addition flag is on (step S116). Here, if the addition flag is on (Yes at step S116), the interpolation module 35 adds the number of diffuse reflection locations and the number of covering candidate locations to the number of partial covering locations in the ROI #1 (step S117) and terminates the process. If the addition flag is not on (No at step S116), the process ends.

As described above, the deposit detection device 1 according to the embodiment includes the calculation module 32, the detection module 33, the interpolation module 35, and the state management module 34. The calculation module 32 calculates the region feature amount based on the edge vector of each pixel PX, for each unit region UA composed of a predetermined number of pixels PX included in the captured image I. The detection module 33 detects each of the unit region UA corresponding to a partial covering location and the unit region UA corresponding to a diffuse reflection location, based on the detection condition for the partial covering (corresponding to an example of "first detection condition") and the detection condition for the diffuse reflection region (corresponding to an example of "second detection condition") based on the region feature amount. The interpolation module 35 interpolates the area ratio of the partial covering locations reduced due to the diffuse reflection locations. The state management module 34 controls the state transitions of the states (1) to (5) related to the interpolation of the area ratio described above, based on increase and decrease of the diffuse reflection locations.

The deposit detection device 1 according to the embodiment therefore can improve the accuracy in deposit detection.

The detection module 33 sets an ROI #2 (corresponding to an example of "second region of interest") larger than an ROI #1 (corresponding to an example of "first region of interest") for detecting a partial covering location in the captured image I and detects a diffuse reflection location based on such an ROI #2.

The deposit detection device 1 according to the embodiment therefore can grasp diffuse reflection regions widely and improve the accuracy in detecting diffuse reflection covering.

The detection module 33 also detects, as a diffuse reflection location, a unit region UA with larger edge intensity and higher brightness than the edge intensity and the brightness of a partial covering location.

The deposit detection device 1 according to the embodiment therefore can detect a diffuse reflection location. The accuracy in detecting a partial covering location can be improved, accordingly.

The interpolation module 35 interpolates the area ratio described above based on the sum value of the number of partial covering locations and the number of diffuse reflection locations.

The deposit detection device 1 according to the embodiment therefore can detect diffuse reflection covering accurately.

The detection module 33 maps the region feature amount calculated by the calculation module 32 into a feature amount space in which elements of such a region feature amount correspond to dimensions, and estimates the unit region serving as a covering candidate location estimated to be covered with a deposit based on the position of the mapped region feature amount, and the interpolation module 35 further adds the number of covering candidate locations to the sum value.

The deposit detection device 1 according to the embodiment therefore can detect diffuse reflection covering even more accurately.

When a predetermined number or more of captured images I in which a predetermined amount of diffuse reflection locations or more is present are successively obtained, the state management module 34 allows the interpolation module 35 to interpolate the area ratio.

The deposit detection device 1 according to the embodiment therefore can detect diffuse reflection covering stably.

In the foregoing embodiment, the angles are classified into four directions obtained by dividing the angles from −180° to 180° into the angle ranges at every 90°. However, the angle range is not limited to 90° and the angles may be classified into six directions obtained by being divided into the angle ranges at every 60°, for example.

The first angle classification and the second angle classification may have different widths of angle ranges. For example, the angles may be classified every 90° in the first angle classification, whereas the angle may be classified every 60° in the second angle classification. In the first angle classification and the second angle classification, the boundaries of angle between the angle ranges may be shifted by 45°. However, the angles may be shifted by more than 45° or less than 45°.

In the foregoing embodiment, the captured image I captured by the on-vehicle camera has been taken as an example. However, the captured image I may be, for example, a captured image I captured by a security camera, a camera installed on a street lamp, or the like. That is, the captured image I may be any captured image captured by a camera with a lens to which a deposit may adhere.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A deposit detection device comprising:
   a processor configured to:
   calculate a region feature amount based on an edge vector of each pixel, for each unit region composed of a predetermined number of pixels included in a captured image;

detect the unit region corresponding to a partial covering location and the unit region corresponding to a not-adhere location based on a first detection condition based on the region feature amount;

detect the unit region corresponding to a diffuse reflection location based on a first detection condition and a second detection condition detection condition and the second detection condition being based on the region feature amount;

interpolate an area ratio of the partial covering location reduced due to the diffuse reflection location; and manage state transitions of states related to interpolation of the area ratio, based on increase and decrease of the diffuse reflection location.

2. The deposit detection device according to claim 1, wherein the processor is configured to set a second region of interest larger than a first region of interest for detecting the partial covering location in the captured image and detects the diffuse reflection location based on the second region of interest.

3. The deposit detection device according to claim 1, wherein the processor is configured to detect, as the diffuse reflection location, the unit region with larger edge intensity and higher brightness than edge intensity and brightness of the partial covering location.

4. The deposit detection device according to claim 2, wherein the processor is configured to detect, as the diffuse reflection location, the unit region with larger edge intensity and higher brightness than edge intensity and brightness of the partial covering location.

5. The deposit detection device according to claim 1, wherein the processor is configured to interpolate the area ratio based on a sum value of the number of the partial covering locations and the number of the diffuse reflection locations.

6. The deposit detection device according to claim 2, wherein the processor is configured to interpolate the area ratio based on a sum value of the number of the partial covering locations and the number of the diffuse reflection locations.

7. The deposit detection device according to claim 3, wherein the processor is configured to interpolate the area ratio based on a sum value of the number of the partial covering locations and the number of the diffuse reflection locations.

8. The deposit detection device according to claim 4, wherein the processor is configured to interpolate the area ratio based on a sum value of the number of the partial covering locations and the number of the diffuse reflection locations.

9. The deposit detection device according to claim 5, wherein the processor is configured to:

map the calculated region feature amount into a feature amount space in which elements of the region feature amount correspond to dimensions, and estimates the unit region serving as a covering candidate location estimated to be covered with a deposit based on a position of the mapped region feature amount, and add the number of the covering candidate locations to the sum value.

10. The deposit detection device according to claim 6, wherein the processor is configured to:

map the calculated region feature amount into a feature amount space in which elements of the region feature amount correspond to dimensions, and estimates the unit region serving as a covering candidate location estimated to be covered with a deposit based on a position of the mapped region feature amount, and add the number of the covering candidate locations to the sum value.

11. The deposit detection device according to claim 7, wherein the processor is configured to:

map the calculated region feature amount into a feature amount space in which elements of the region feature amount correspond to dimensions, and estimates the unit region serving as a covering candidate location estimated to be covered with a deposit based on a position of the mapped region feature amount, and add the number of the covering candidate locations to the sum value.

12. The deposit detection device according to claim 8, wherein the processor is configured to:

map the calculated region feature amount into a feature amount space in which elements of the region feature amount correspond to dimensions, and estimates the unit region serving as a covering candidate location estimated to be covered with a deposit based on a position of the mapped region feature amount, and add the number of the covering candidate locations to the sum value.

13. The deposit detection device according to claim 1, wherein the processor is configured to interpolate the area ratio when a predetermined number or more of the captured images in which a predetermined amount or more of the diffuse reflection locations are present are successive.

14. The deposit detection device according to claim 1, wherein the processor is configured to:

acquire the captured image as a plurality of time-series continuous frames; and interpolate the area ratio based on a sum value of a number of the partial covering locations and a number of the diffuse reflection locations in a singular frame among the time-series continuous frames.

15. The deposit detection device according to claim 14, wherein the processor is configured to:

acquire the captured image through a lens, wherein the diffuse reflection locations and the partial covering locations are in a state, in which brightness change appears to be uneven, due to the lens being covered with snow.

16. A deposit detection method comprising:

calculating a region feature amount based on an edge vector of each pixel, for each unit region composed of a predetermined number of pixels included in a captured image;

detecting the unit region corresponding to a partial covering location and the unit region corresponding to a not-adhere location based on a first detection condition based on the region feature amount;

detecting the unit region corresponding to a diffuse reflection location based on a first detection condition and a second detection condition based on the region feature amount;

interpolating an area ratio of the partial covering location reduced due to the diffuse reflection location; and managing state transitions of states related to interpolation of the area ratio, based on increase and decrease of the diffuse reflection location.

17. The deposit detection method according to claim 16, further comprising:

acquiring the captured image as a plurality of time-series continuous frames; and interpolating the area ratio based on a sum value of a number of the partial covering locations and a number of the diffuse reflection locations in a singular frame among the time-series continuous frames.

18. The deposit detection method according to claim 17, wherein the captured image is acquired through a lens, and the diffuse reflection locations and the partial covering locations are in a state, in which brightness change appears to be uneven, due to the lens covered with snow.

\* \* \* \* \*